United States Patent
Knowles et al.

(10) Patent No.: US 6,360,947 B1
(45) Date of Patent: *Mar. 26, 2002

(54) AUTOMATED HOLOGRAPHIC-BASED TUNNEL-TYPE LASER SCANNING SYSTEM FOR OMNI-DIRECTIONAL SCANNING OF BAR CODE SYMBOLS ON PACKAGE SURFACES FACING ANY DIRECTION OR ORIENTATION WITHIN A THREE-DIMENSIONAL SCANNING VOLUME DISPOSED ABOVE A CONVEYOR BELT

(75) Inventors: C. Harry Knowles, Morristown, NJ (US); LeRoy Dickson, Morgan Hill, CA (US); Timothy A. Good, Blackwood, NJ (US); Thomas C. Amundsen, Turnersville, NJ (US); Charles Naylor; David Wilz, Sr., both of Sewell, NJ (US); Thomas Carullo, Marlton, NJ (US)

(73) Assignee: Metrologic Instruments, Inc., Blackwood, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,146

(22) Filed: Mar. 24, 1998

Related U.S. Application Data

(63) Continuation-in-part of application No. 08/949,915, filed on Oct. 14, 1997, which is a continuation-in-part of application No. 08/854,832, filed on May 12, 1997, now Pat. No. 6,085,978, which is a continuation-in-part of application No. 08/886,806, filed on Apr. 22, 1997, now Pat. No. 5,984,185, which is a continuation-in-part of application No. 08/726,522, filed on Oct. 7, 1996, now Pat. No. 6,073,846, which is a continuation-in-part of application No. 08/573,949, filed on Dec. 18, 1995, now abandoned.

(51) Int. Cl.$^7$ ................................................. G06K 8/10
(52) U.S. Cl. ........................... 235/462.01; 235/462.43; 235/462.34; 235/462.22
(58) Field of Search .................. 235/462.01, 472.01, 235/462.43, 462.32, 462.22, 462.34; 356/385, 389, 383, 384

(56) References Cited

U.S. PATENT DOCUMENTS 4,333,006 A    6/1982  Gorin et al.

FOREIGN PATENT DOCUMENTS

| GB | 2 189 594 A | 10/1997 | |
| WO | WO 97/22082 | 6/1997 | ............ G06K/7/10 |

OTHER PUBLICATIONS

Accu–Sort—Tunnel Scanning System by, www.accusort.com/mktg/as01.html, 1999, p. 1–2.

(List continued on next page.)

Primary Examiner—Thien M. Le
(74) Attorney, Agent, or Firm—Thomas J. Perkowski, Esq., P.C.

(57) ABSTRACT

A fully automated package identification and measuring system, in which an omni-directional laser scanning system are used to read bar codes on packages entering the tunnel, while a package dimensioning subsystem is used to capture information about the package prior to entry into the tunnel. Mathematical models are created on a real-time basis for the geometry of the package and the position of the laser scanning beam used to read the bar code symbol thereon. The mathematical models are analyzed to determine if collected and queued package identification data is spatially and/or temporally correlated with package measurement data using vector-based ray-tracing methods, homogeneous transformations, and object-oriented decision logic so as to enable simultaneous tracking of multiple packages being transported through the scanning tunnel.

8 Claims, 35 Drawing Sheets

U.S. PATENT DOCUMENTS

| | | | |
|---|---|---|---|
| 4,580,894 A | | 4/1986 | Wojeik |
| 4,939,355 A | * | 7/1990 | Rando et al. ............... 235/467 |
| 5,051,567 A | * | 9/1991 | Tedesco ..................... 235/462 |
| 5,262,625 A | * | 11/1993 | Tom et al. .................. 235/462 |
| 5,331,118 A | | 7/1994 | Jensen |
| 5,495,097 A | * | 2/1996 | Katz et al. .................. 235/462 |
| 5,547,034 A | | 8/1996 | Wurz et al. |
| 5,555,090 A | | 9/1996 | Schutz |
| 5,633,487 A | | 5/1997 | Schmutz et al. |
| 5,661,561 A | | 8/1997 | Wurz et al. |
| 5,689,092 A | | 11/1997 | Wurz |
| 5,699,161 A | * | 12/1997 | Woodworth ............... 356/379 |
| 5,723,852 A | * | 3/1998 | Rando et al. ............... 235/467 |
| 5,737,438 A | | 4/1998 | Zlotnick |
| 5,761,877 A | * | 6/1998 | Quandt ....................... 53/155 |
| 5,814,802 A | | 9/1998 | Hecht et al. |
| 5,825,006 A | * | 10/1998 | Longracre, Jr. et al. .... 235/462 |
| 5,869,827 A | | 2/1999 | Rando |
| 5,870,220 A | | 2/1999 | Migdal et al. |
| 5,900,611 A | | 5/1999 | Hecht |
| 5,923,428 A | * | 7/1999 | Woodworth ............... 356/375 |
| 5,969,823 A | | 10/1999 | Wurz et al. |
| 5,979,760 A | | 11/1999 | Freyman et al. |
| 5,984,186 A | | 11/1999 | Tafoya |
| 5,991,041 A | | 11/1999 | Woodworth |
| 6,053,409 A | | 4/2000 | Brobst et al. |
| 6,123,264 A | | 9/2000 | Li et al. |
| 6,147,358 A | | 11/2000 | Hecht |

OTHER PUBLICATIONS

Dimensioning the Right Way: Reliably by, Cargoscan, 1998, p. 1–16.

The Accu–Sort Advantage–The Mini–X by, Accu–Sort Systems, Inc., Telford, PA, 1998.

OMNI–SCAN TUNNEL by, Metrologic Instruments, Inc., 1997.

International Search Report, 2000.

* cited by examiner

TUNNEL SCANNER POSITIONING DATA:

| SCANNER: | ROTATION ANGLES (degrees): | | | POSITION COORDINATES (inches): | | |
|---|---|---|---|---|---|---|
| | YAW | RITCH | ROLL | X | Y | Z |
| TOP/FRONT | 0 | 80 | 0 | 1 | 73 | -10 |
| TOP/BACK | 0 | 100 | 0 | -1 | 66 | 10 |
| FRONT | 0 | 40 | 0 | 0 | 57 | -40 |
| BACK | 0 | 130 | 0 | 0 | 57 | 40 |
| RIGHT SIDE/FRONT | 60 | 0 | 90 | -45 | 18 | -12 |
| RIGHT SIDE/BACK | 120 | 0 | 90 | -45 | 18 | 12 |
| LEFT SIDE/FRONT | -60 | 0 | 90 | 45 | 18 | -12 |
| LEFT SIDE/BACK | -120 | 0 | 90 | 45 | 18 | 12 |
| L/F CORNER #1 | -30 | 15 | -7 | 29 | 18 | -80 |
| L/F CORNER #2 | -30 | 15 | -7 | 40 | 18 | -59 |
| L/B CORNER #1 | -150 | 15 | 7 | 29 | 18 | 80 |
| L/B CORNER #2 | -150 | 15 | 7 | 40 | 18 | 68 |
| R/F CORNER #1 | 30 | 15 | 7 | -29 | 18 | -80 |
| R/F CORNER #2 | 30 | 15 | 7 | -40 | 18 | -59 |
| R/B CORNER #1 | 150 | 15 | -7 | -29 | 18 | 80 |
| R/B CORNER #2 | 150 | 15 | -7 | -40 | 18 | 68 |

ROTATION OCCURS IN THE ORDER GIVEN: YAW, PITCH, ROLL
POSITIVE YAW IS FROM R-AXIS TO P-AXIS
POSITIVE PITCH IS FROM Y-AXIS TO R-AXIS
POSITIVE ROLL IS FROM P-AXIS TO Y-AXIS

POSITION COORDINATES ARE OF THE CENTER OF THE DISC WITHIN THE FIXED (X,Y,Z) SYSTEM

FIG. 2C

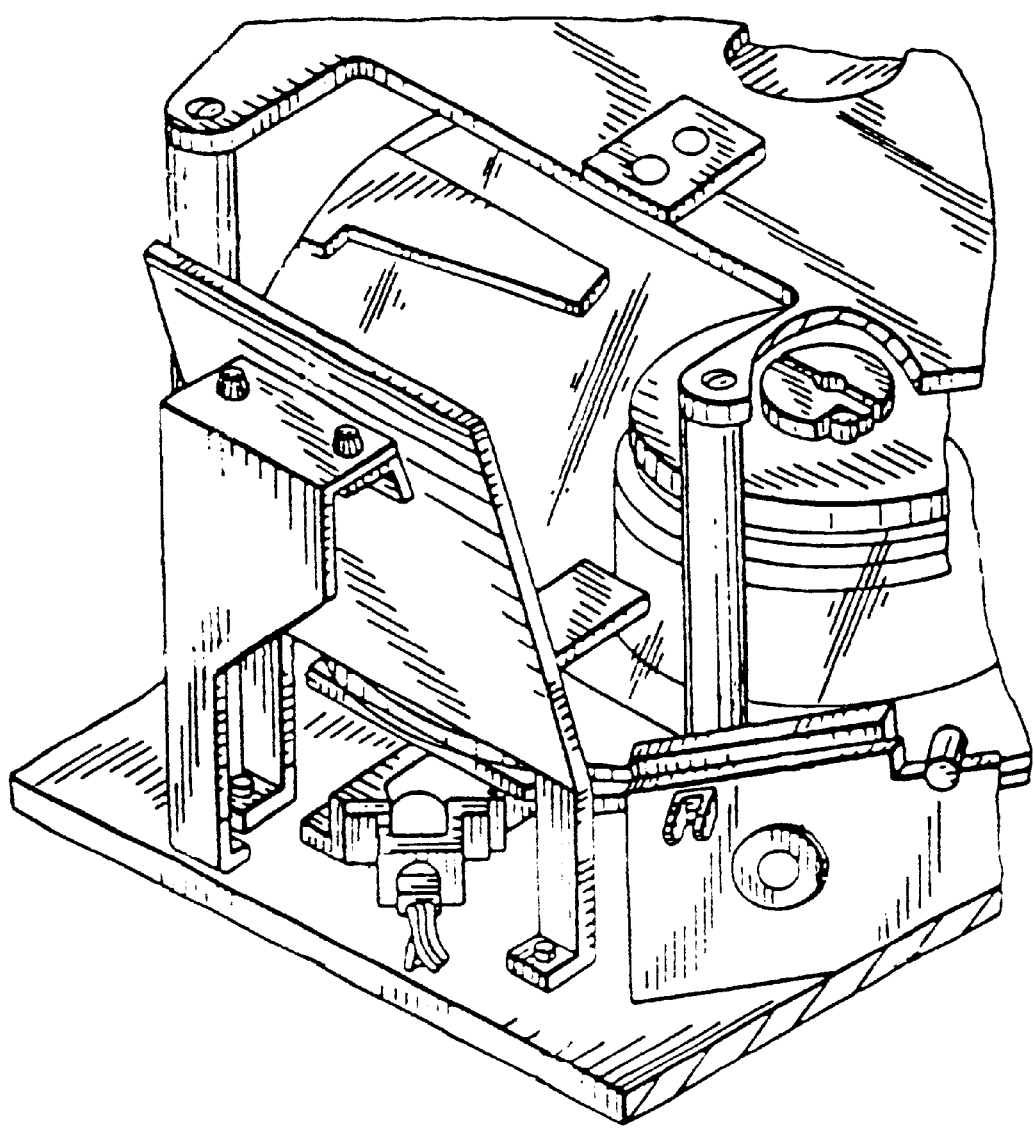
FIG. 3A1

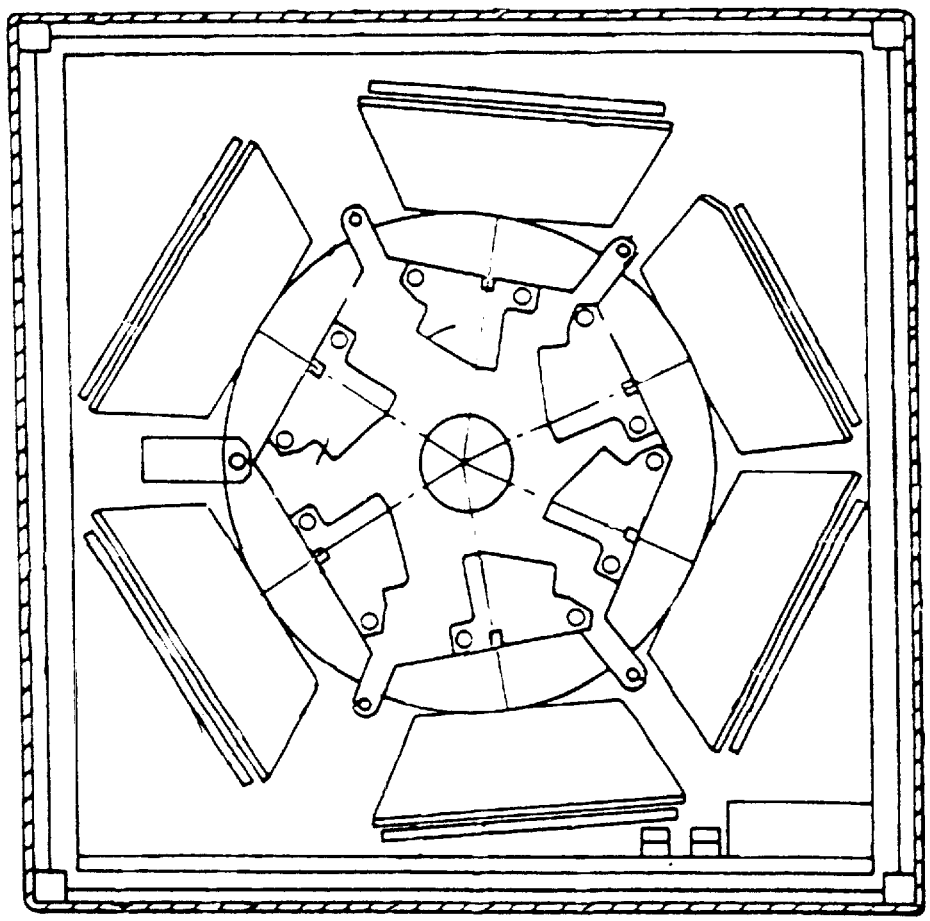
SCANNERS:
- L/F CORNER #1
- L/F CORNER #2
- R/F CORNER #1
- R/F CORNER #2
- L/B CORNER #1
- L/B CORNER #2
- R/B CORNER #1
- R/B CORNER #2
FIG. 3A2

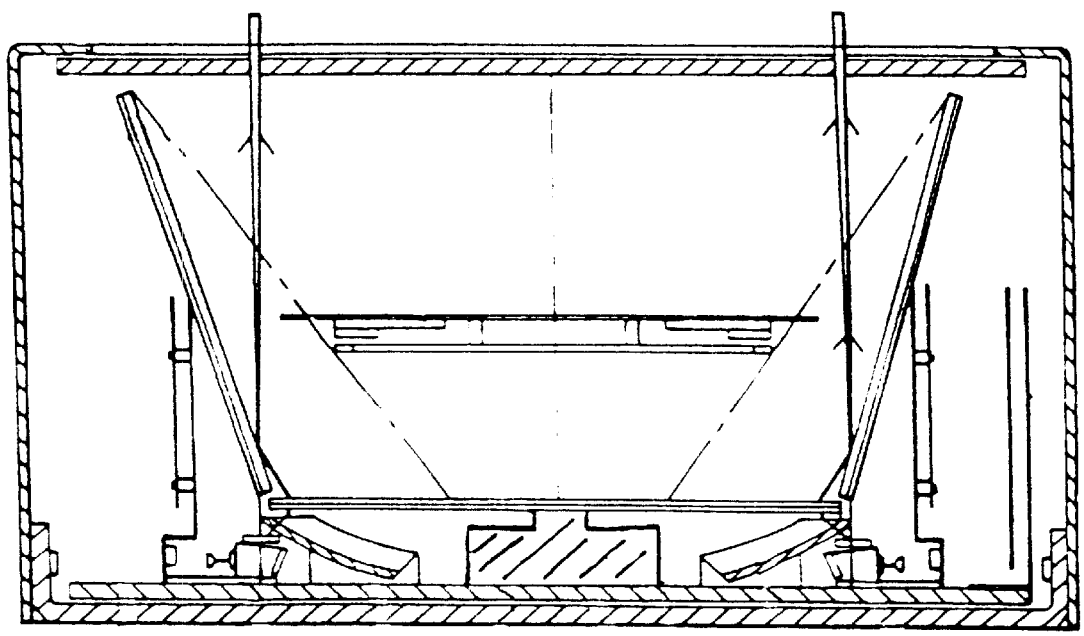
FIG. 3A3

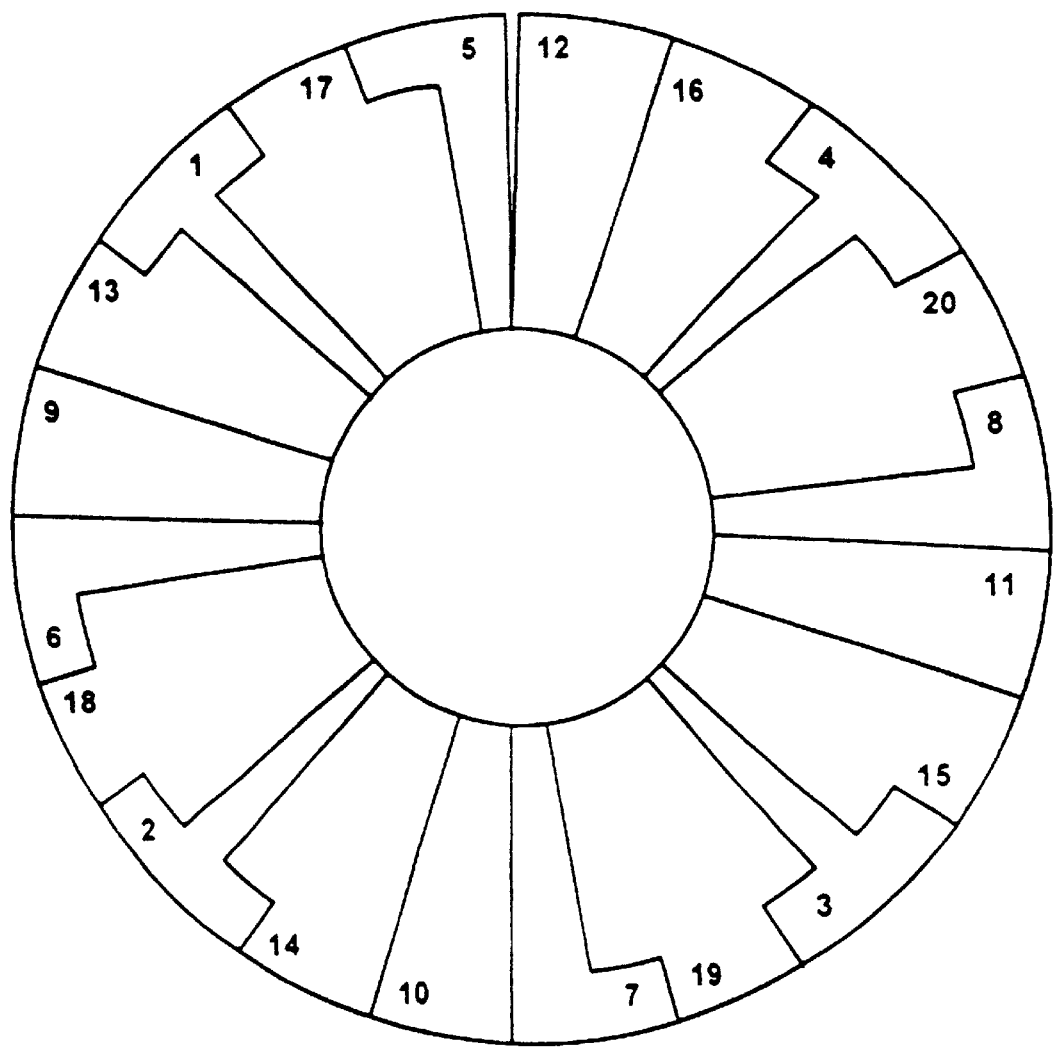
FIG. 3A4

| ROTATIONAL SPEED OF DISK (rpm) | | | | | |
|---|---|---|---|---|---|
| X-SCAN 4 LINES/ 5 FOCAL PLANES | | | | | WAVELENGTH: |
| FACET | DIFFRACTION FOCAL LENGTH (inches) | GEOMETRICAL FOCAL LENGTH (inches) | ANGLE A (degrees) | ANGLE B (degrees) | ANGLE OF DIFFRACTION (degrees) |
| 1 | 39.00 | 39.07 | 45.9 | 57.40 | 32.60 |
| 2 | 39.00 | 39.07 | 45.9 | 57.40 | 32.60 |
| 3 | 39.00 | 39.07 | 45.9 | 57.40 | 32.60 |
| 4 | 39.00 | 39.07 | 45.9 | 57.40 | 32.60 |
| 5 | 45.01 | 45.11 | 45.9 | 57.00 | 33.00 |
| 6 | 45.01 | 45.11 | 45.9 | 57.00 | 33.00 |
| 7 | 45.01 | 45.11 | 45.9 | 57.00 | 33.00 |
| 8 | 45.01 | 45.11 | 45.9 | 57.00 | 33.00 |
| 9 | 51.51 | 51.66 | 45.9 | 56.67 | 33.33 |
| 10 | 51.51 | 51.66 | 45.9 | 56.67 | 33.33 |
| 11 | 51.51 | 51.66 | 45.9 | 56.67 | 33.33 |
| 12 | 51.51 | 51.66 | 45.9 | 56.67 | 33.33 |
| 13 | 58.32 | 58.64 | 45.9 | 56.40 | 33.60 |
| 14 | 58.32 | 58.64 | 45.9 | 56.40 | 33.60 |
| 15 | 58.32 | 58.64 | 45.9 | 56.40 | 33.60 |
| 16 | 58.32 | 58.64 | 45.9 | 56.40 | 33.60 |
| 17 | 64.93 | 65.24 | 45.9 | 56.19 | 33.81 |
| 18 | 64.93 | 65.24 | 45.9 | 56.19 | 33.81 |
| 19 | 64.93 | 65.24 | 45.9 | 56.19 | 33.81 |
| 20 | 64.93 | 65.24 | 45.9 | 56.19 | 33.81 |
| | | AVERAGE ANGLE B(degrees): | | 56.73 | |
| APPROXIMATE MINIMUM BOX WIDTH: | | 12.57 inches | | | |
| (BASED ON LARGE MIRROR AS LIMITATION) | | | | | |

FIG. 3A5A

| 6000 | | | | ACCOUNTING FOR DEAD TIME FOR LASER BEAM 2.59 (degrees) |
|---|---|---|---|---|
| 685 mm | | | | |
| ANGLE OF BEAM FROM VERTICAL (degrees) | SCAN ANGLE (degrees) | SCAN MULT. FACTOR(m) | ROTATION ANGLE (degrees) | |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 0.60 | 25.99 | 1.34 | 19.43 | 22.03 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.00 | 22.62 | 1.33 | 17.01 | 19.61 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.33 | 19.82 | 1.32 | 14.98 | 17.67 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.60 | 17.64 | 1.32 | 13.31 | 15.91 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| 1.81 | 15.78 | 1.31 | 12.01 | 14.51 |
| | AVERAGE: | 1.33 | | |
| SUMS | 407.01 | | 307.00 | 358.88 |
| TOTAL FACET ANGULAR SWEEP (degrees): | | | | 358.88 |

FIG. 3A5B

| LIGHT COLLECTION FACTOR | MAXIMUM COLLECTION AREA (IGNORING NOTCH) (sq. in) | DESIGN COLLECTION AREA (INCLUDES NOTCH LOSS OF 0.15) (sq. inches) | BEAM SPEED AT CENTER OF SCAN LINE (inches/sec) | BEAM SPEED AT MAX DEPTH OF FIELD (inches/sec) | BEAM SPEED AT MIN DEPTH OF FIELD (inches/sec) |
|---|---|---|---|---|---|
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.00 | 1.25 | 1.32 | 32770 | 38130 | 29401 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.35 | 1.68 | 1.72 | 37596 | 40937 | 34264 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 1.78 | 2.22 | 2.23 | 42824 | 46150 | 39490 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.30 | 2.87 | 2.63 | 48295 | 51608 | 44983 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 2.87 | 3.57 | 3.49 | 53606 | 56908 | 50303 |
| 37.18 | 48.34 | 46.34 | | SUMS | |
| | | Vmax (in/s): | 56908 | | |
| | | Vmin (in/s): | 29409 | | |
| | | RATIO | 1.34 | | |

FIG. 3A5C

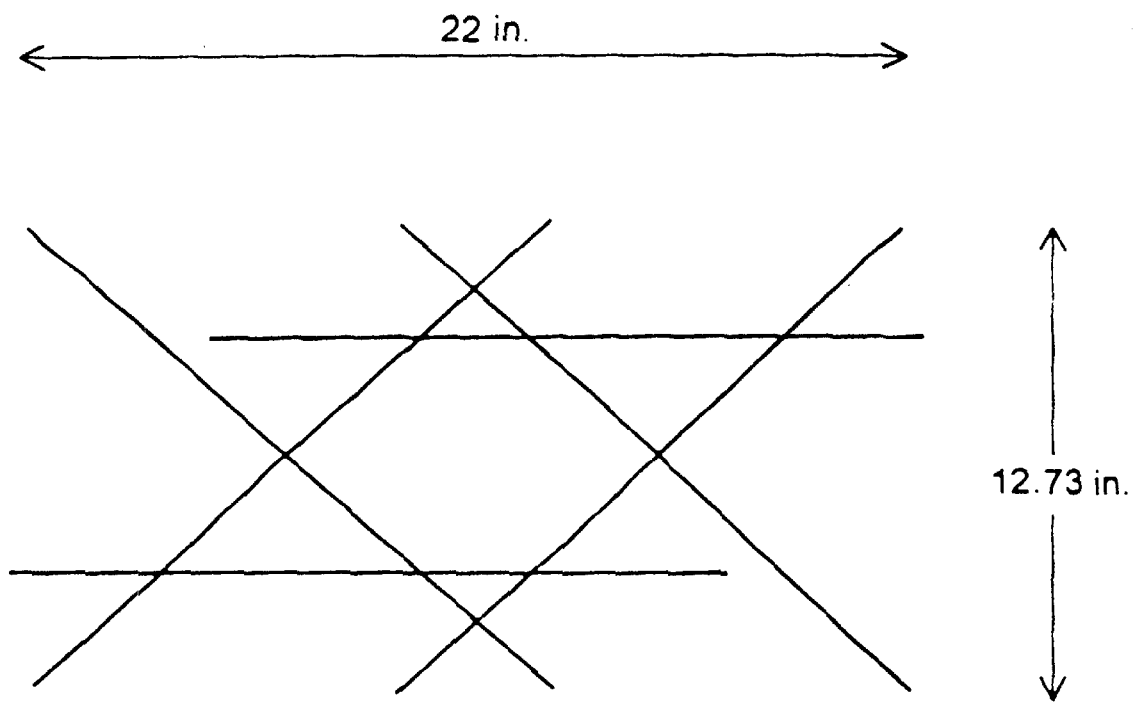
CONVEYOR SCANNER SCAN PATTERN
AT THE MIDDLE FOCAL PLANE
FIG. 3A6

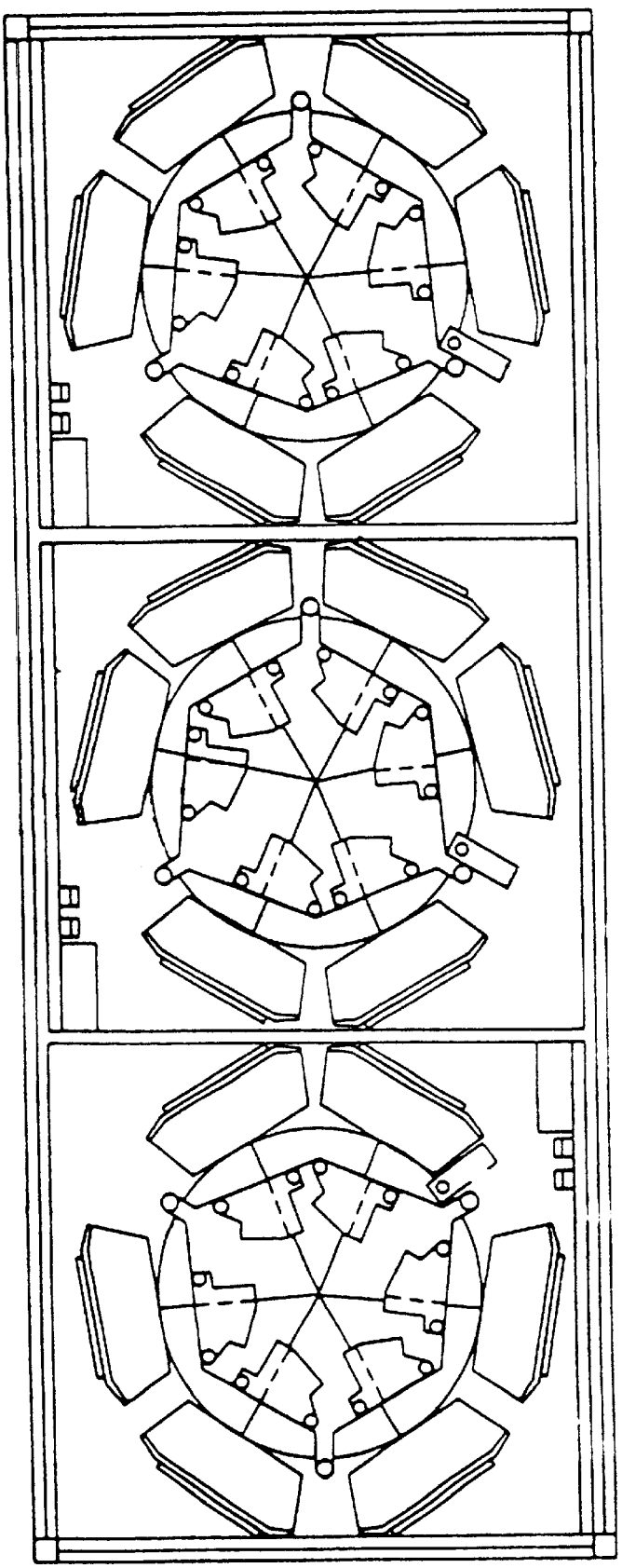
FIG. 3B1
SCANNERS:
- TOP FRONT
- TOP BACK
- LEFT SIDE/FRONT
- LEFT SIDE/BACK
- RIGHT SIDE/FRONT
- RIGHT SIDE/BACK

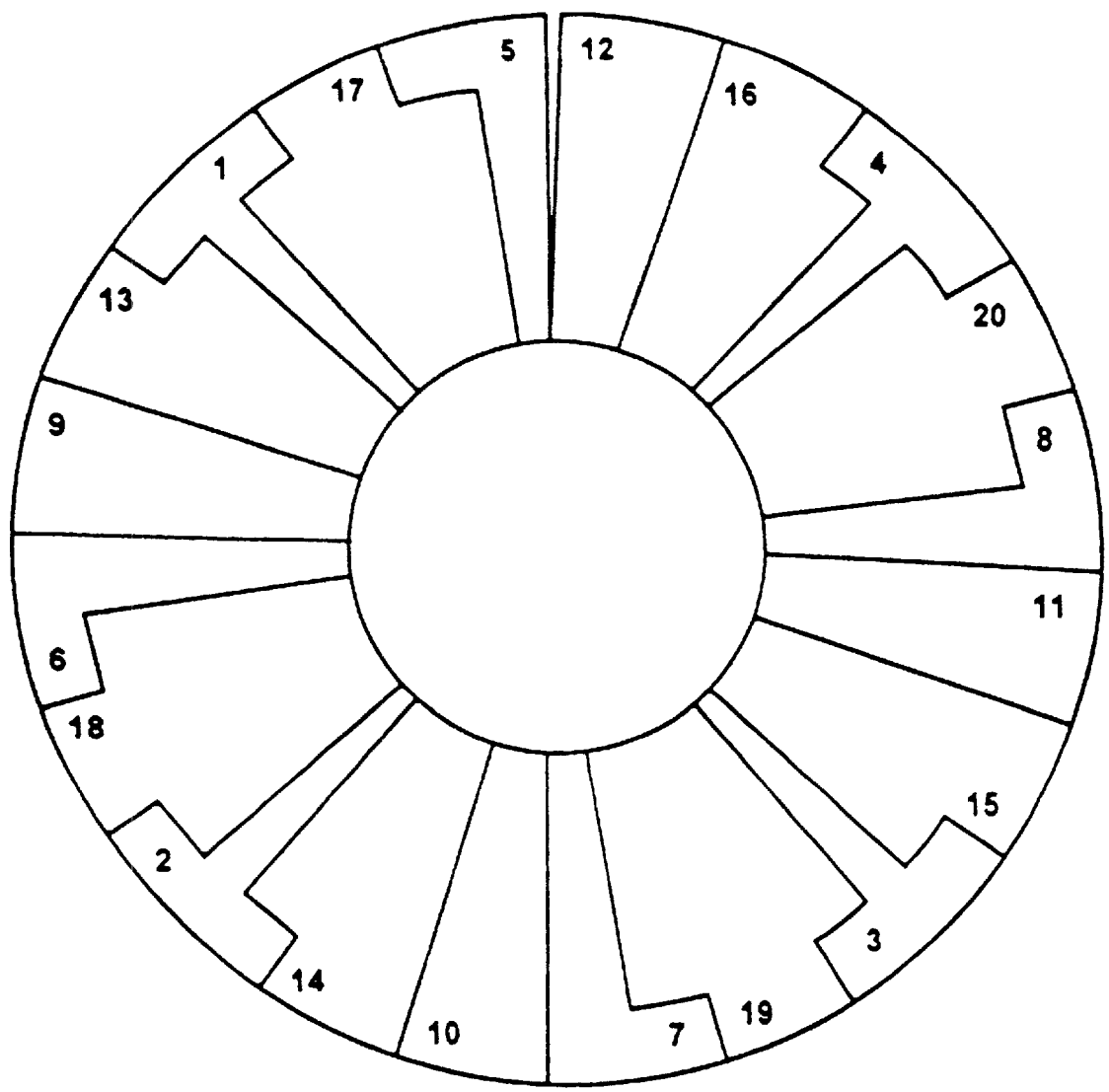
FIG. 3B2

ROTATIONAL SPEED OF DISK (RPM)
TUNNEL SCANNER 1: 4 LINES/5 FOCAL PLANES DISK
WAVELENGTH: 685NM

| FACET | DIFFRACTION FOCAL LENGTH (INCHES) | GEOMETRICAL FOCAL LENGTH (INCHES) | ANGLE A (DEGREES) | ANGLE B (DEGREES) | ANGLE OF DIFFRACTION (DEGREES) | ANGLE OF BEAM FROM VERTICAL (DEGREES) | SCAN ANGLE (DEGREES) |
|---|---|---|---|---|---|---|---|
| 1 | 39.04 | 39.11 | 45.9 | 55.30 | 34.70 | 2.70 | 26.24 |
| 2 | 39.04 | 39.11 | 45.9 | 55.30 | 34.70 | 2.70 | 26.24 |
| 3 | 39.04 | 39.11 | 45.9 | 55.30 | 34.70 | 2.70 | 26.24 |
| 4 | 39.04 | 39.11 | 45.9 | 55.30 | 34.70 | 2.70 | 26.24 |
| 5 | 45.04 | 45.14 | 45.9 | 55.54 | 34.46 | 2.46 | 22.84 |
| 6 | 45.04 | 45.14 | 45.9 | 55.54 | 34.46 | 2.46 | 22.84 |
| 7 | 45.04 | 45.14 | 45.9 | 55.54 | 34.46 | 2.46 | 22.84 |
| 8 | 45.04 | 45.14 | 45.9 | 55.54 | 34.46 | 2.46 | 22.84 |
| 9 | 51.54 | 51.69 | 45.9 | 55.73 | 34.27 | 2.27 | 20.03 |
| 10 | 51.54 | 51.69 | 45.9 | 55.73 | 34.27 | 2.27 | 20.03 |
| 11 | 51.54 | 51.69 | 45.9 | 55.73 | 34.27 | 2.27 | 20.03 |
| 12 | 51.54 | 51.69 | 45.9 | 55.73 | 34.27 | 2.27 | 20.03 |
| 13 | 58.34 | 58.56 | 45.9 | 55.89 | 34.11 | 2.11 | 17.73 |
| 14 | 58.34 | 58.56 | 45.9 | 55.89 | 34.11 | 2.11 | 17.73 |
| 15 | 58.34 | 58.56 | 45.9 | 55.89 | 34.11 | 2.11 | 17.73 |
| 16 | 58.34 | 58.56 | 45.9 | 55.89 | 34.11 | 2.11 | 17.73 |
| 17 | 64.94 | 65.24 | 45.9 | 56.02 | 33.98 | 1.98 | 15.95 |
| 18 | 64.94 | 65.24 | 45.9 | 56.02 | 33.98 | 1.98 | 15.95 |
| 19 | 64.94 | 65.24 | 45.9 | 56.02 | 33.98 | 1.98 | 15.95 |
| 20 | 64.94 | 65.24 | 45.9 | 56.02 | 33.98 | 1.98 | 15.95 |

FIG. 3B3A

| FACET | SCAN MULT. FACTOR (m) | ROTATION ANGLE (DEGREES) | ACCOUNTING FOR DEAD TIME FOR LASER BEAM 2.59 (DEGREES) | LIGHT COLLECTION FACTOR | MAXIMUM COLLECTION AREA (IGNORING NOTCH) (SQ. IN.) | DESIGN COLLECTION AREA (INCLUDES NOTCH LOSS OF 0.15 SQ.INCHES) |
|---|---|---|---|---|---|---|
| 1 | 1.37 | 19.19 | 21.78 | 1.00 | 1.29 | 1.36 |
| 2 | 1.37 | 19.19 | 21.78 | 1.00 | 1.29 | 1.36 |
| 3 | 1.37 | 19.19 | 21.78 | 1.00 | 1.29 | 1.36 |
| 4 | 1.37 | 19.19 | 21.78 | 1.00 | 1.29 | 1.36 |
| 5 | 1.35 | 16.91 | 19.51 | 1.32 | 1.71 | 1.75 |
| 6 | 1.35 | 16.91 | 19.51 | 1.32 | 1.71 | 1.75 |
| 7 | 1.35 | 16.91 | 19.51 | 1.32 | 1.71 | 1.75 |
| 8 | 1.35 | 16.91 | 19.51 | 1.32 | 1.71 | 1.75 |
| 9 | 1.34 | 14.98 | 17.58 | 1.72 | 2.23 | 2.23 |
| 10 | 1.34 | 14.98 | 17.58 | 1.72 | 2.23 | 2.23 |
| 11 | 1.34 | 14.98 | 17.58 | 1.72 | 2.23 | 2.23 |
| 12 | 1.34 | 14.98 | 17.58 | 1.72 | 2.23 | 2.23 |
| 13 | 1.33 | 13.38 | 15.97 | 2.19 | 2.84 | 2.81 |
| 14 | 1.33 | 13.38 | 15.97 | 2.19 | 2.84 | 2.81 |
| 15 | 1.33 | 13.38 | 15.97 | 2.19 | 2.84 | 2.81 |
| 16 | 1.33 | 13.38 | 15.97 | 2.19 | 2.84 | 2.81 |
| 17 | 1.32 | 12.12 | 14.71 | 2.71 | 3.51 | 3.43 |
| 18 | 1.32 | 12.12 | 14.71 | 2.71 | 3.51 | 3.43 |
| 19 | 1.32 | 12.12 | 14.71 | 2.71 | 3.51 | 3.43 |
| 20 | 1.32 | 12.12 | 14.71 | 2.71 | 3.51 | 3.43 |

FIG. 3B3B

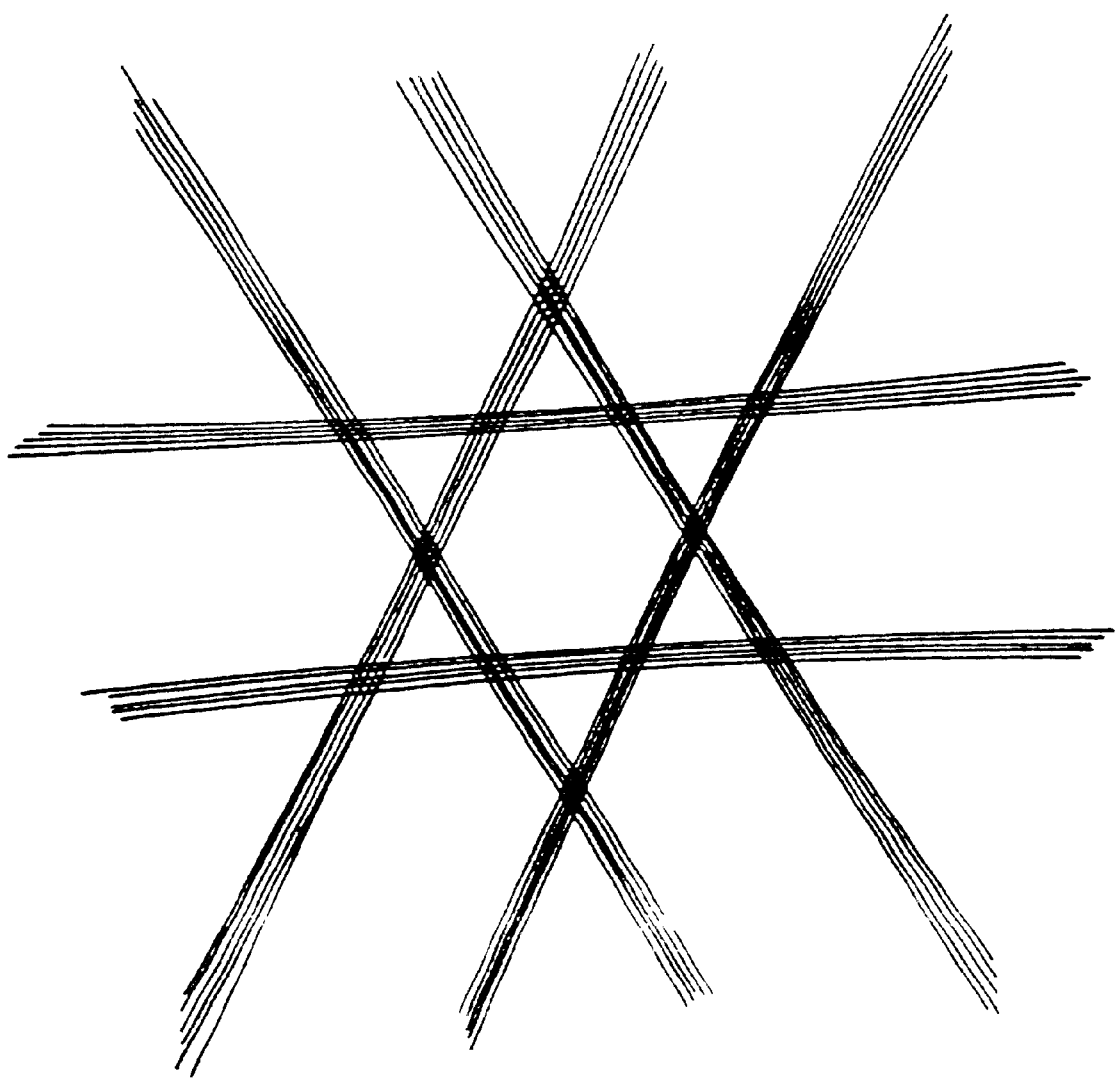
FIG. 3B4

Mirror angles for the 60 degrees

The angle delta is the angular spacing between the mirror and its following neighbour mirror

| Mirror | Angular location of folding mirrors (degrees) | delta | Angular rotation of folding mirrors (degrees) | |
|---|---|---|---|---|
| 1 | 25.61 | 64.39 | 2.28 | CCW |
| 2 | 90.00 | 64.39 | 0.00 | CW |
| 3 | 154.39 | 51.23 | 2.28 | CW |
| 4 | 205.61 | 64.39 | 2.28 | CCW |
| 5 | 270.00 | 64.39 | 0.00 | CW |
| 6 | 334.39 | 51.23 | 2.28 | CW |

FIG. 3B5

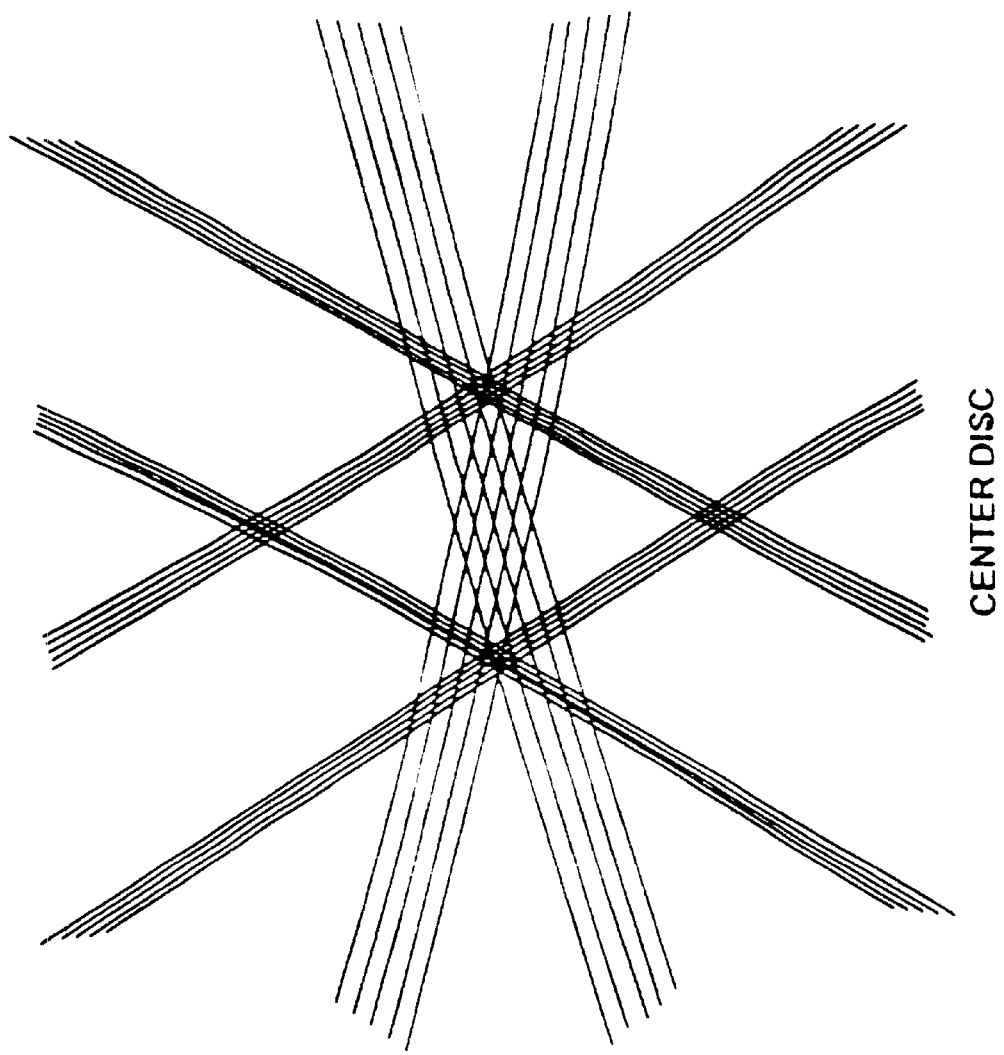
FIG. 3B6 CENTER DISC

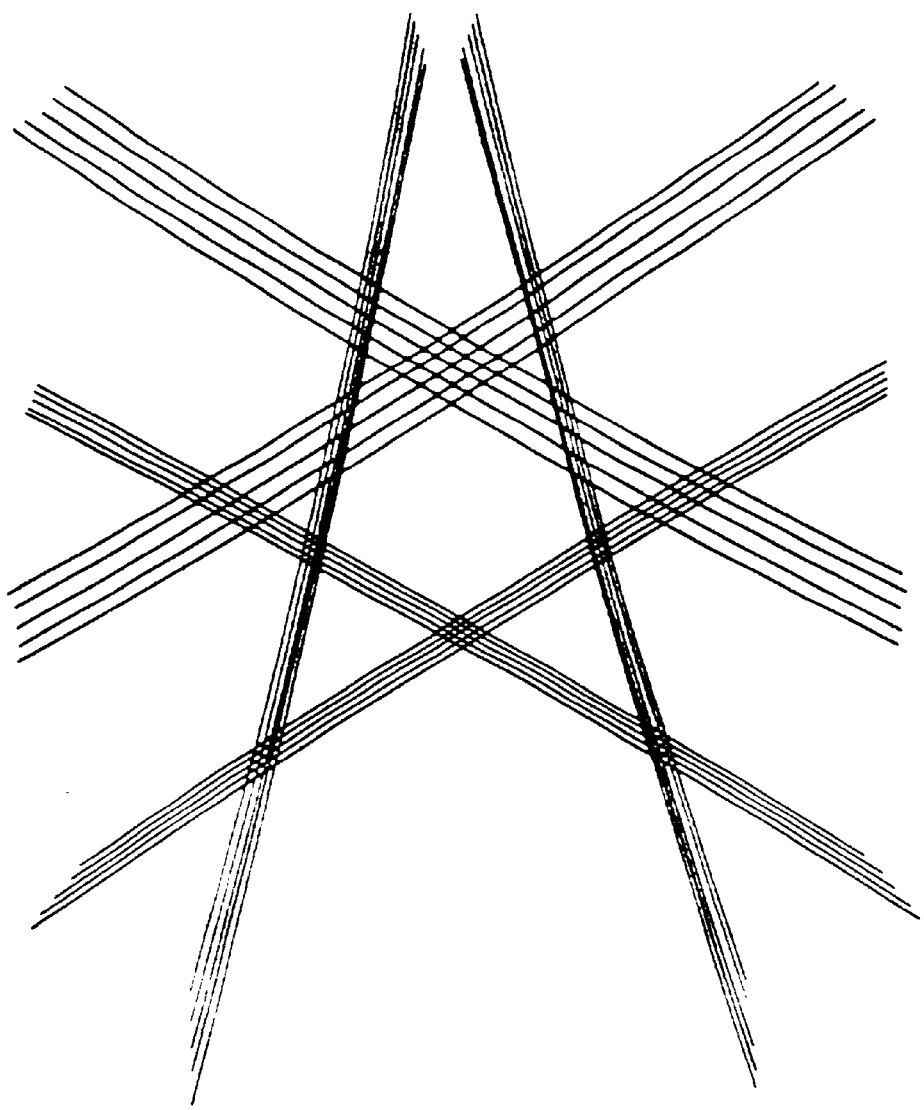
FIG. 3B7 END DISCS

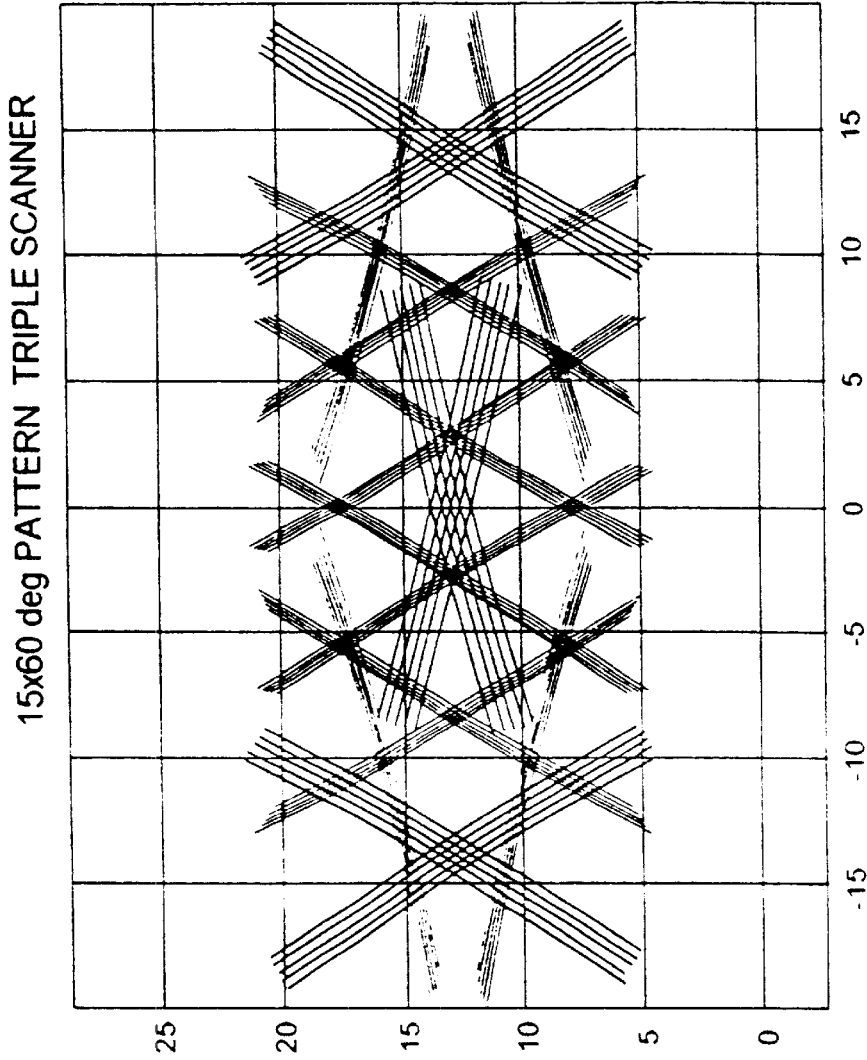
FIG. 3B8

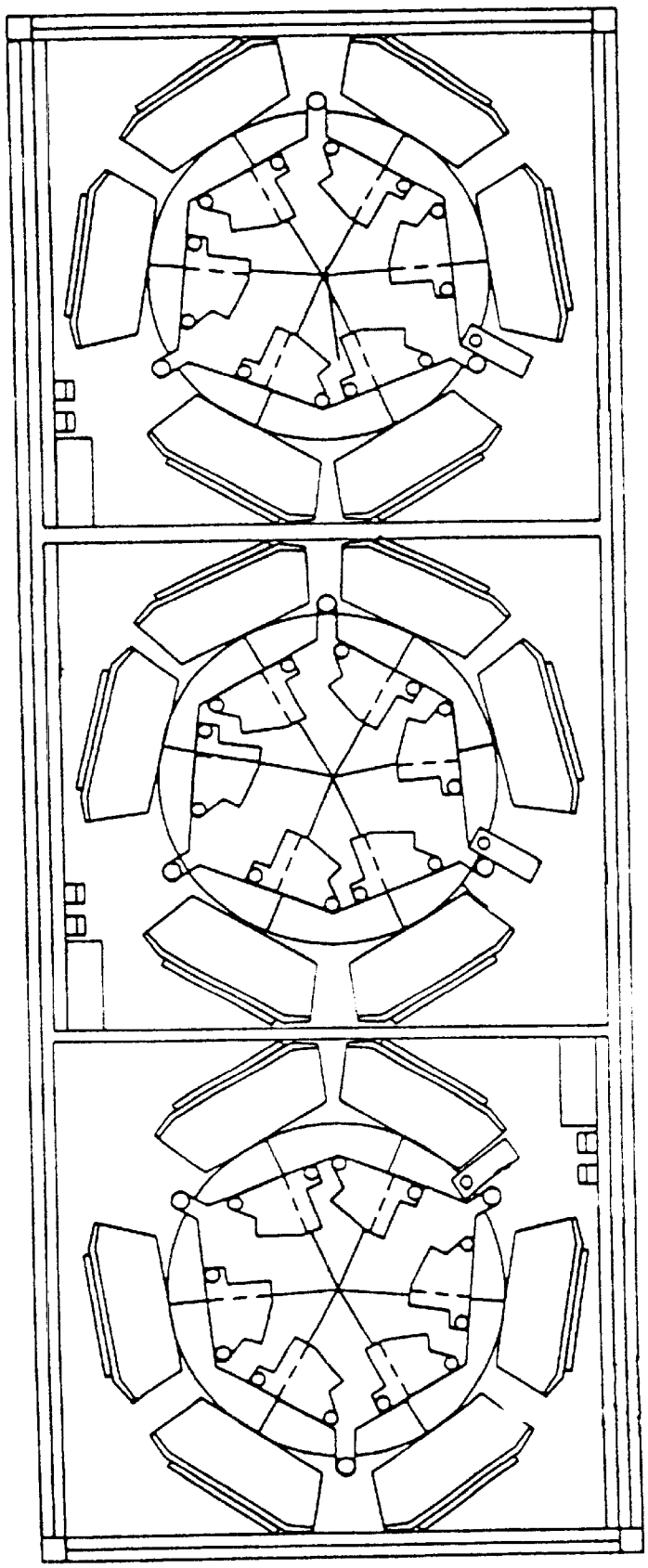
FIG. 3C1
SCANNERS:
- FRONT
- BACK

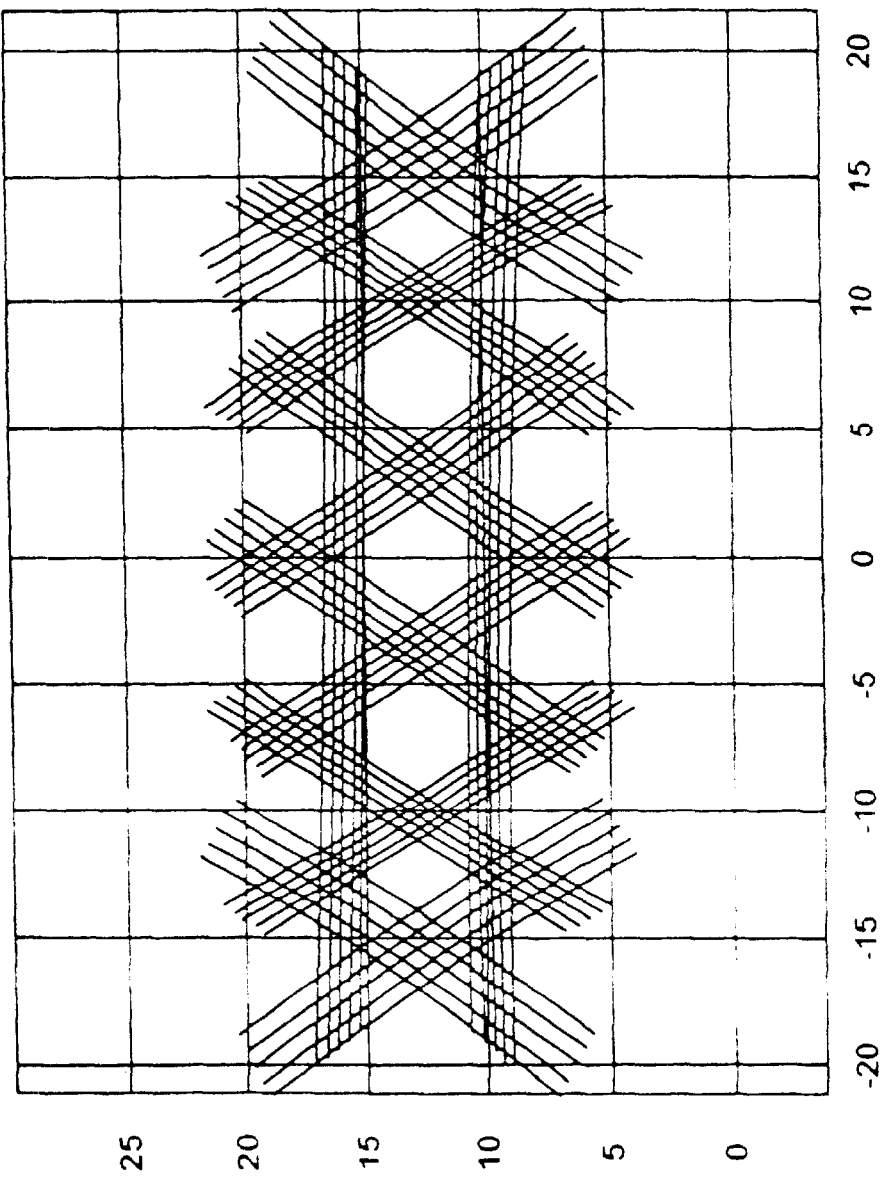
FIG. 3C2

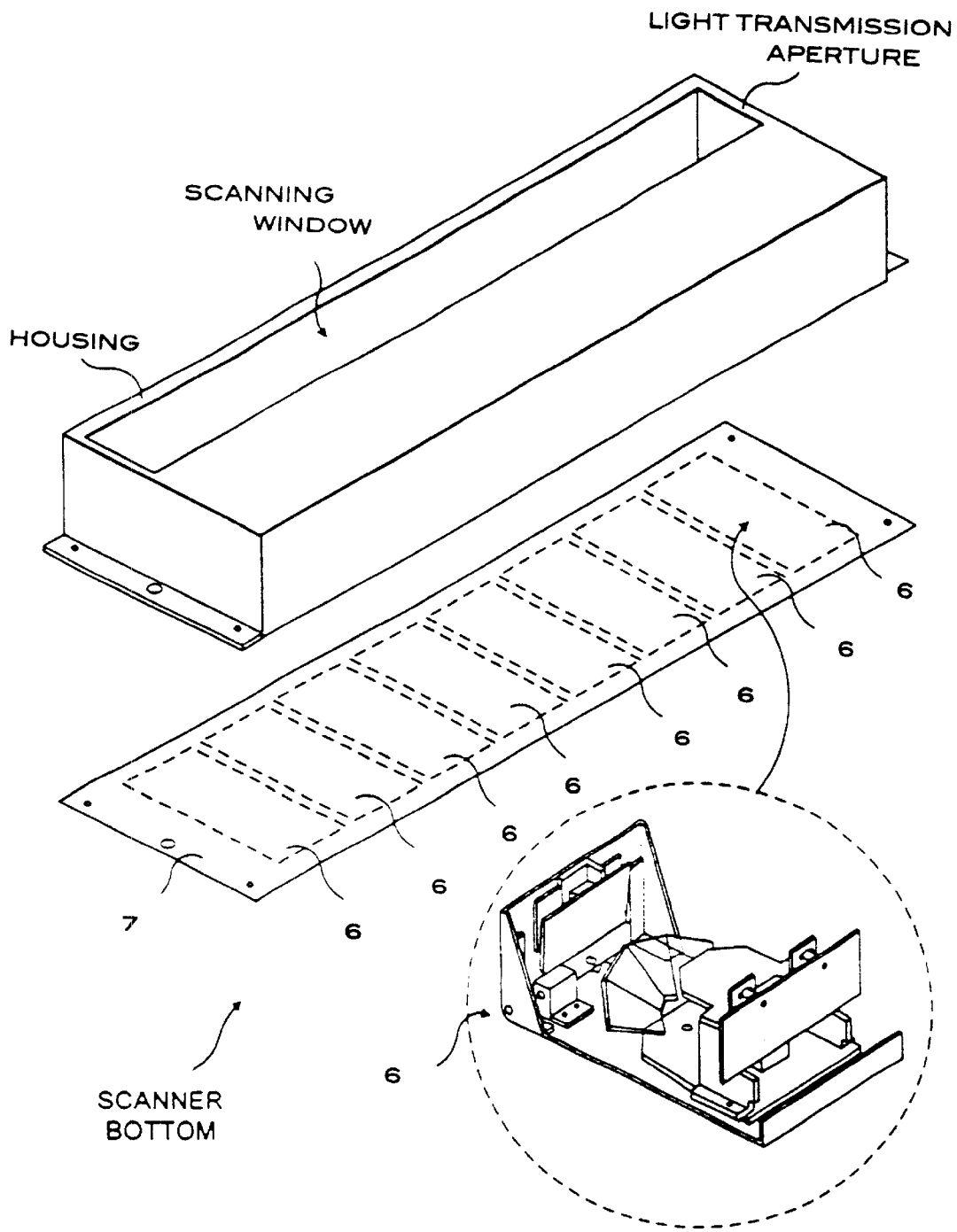
FIG. 3D1

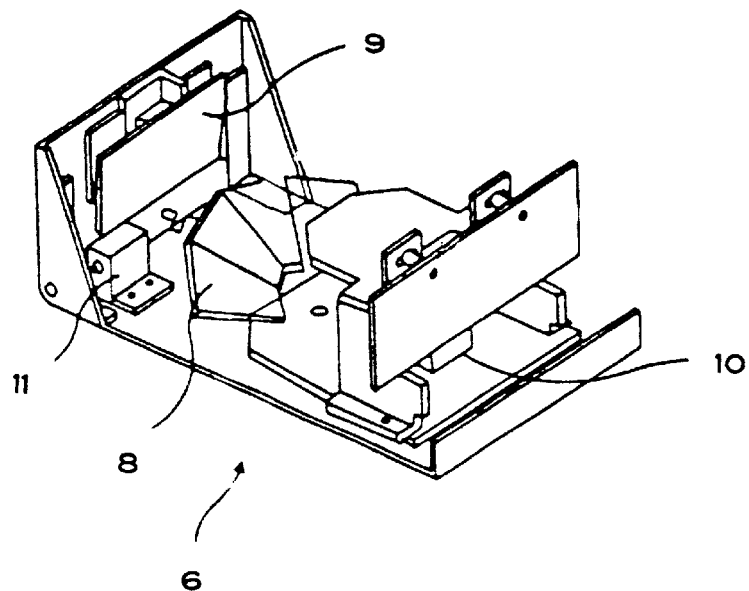
FIG. 3D2
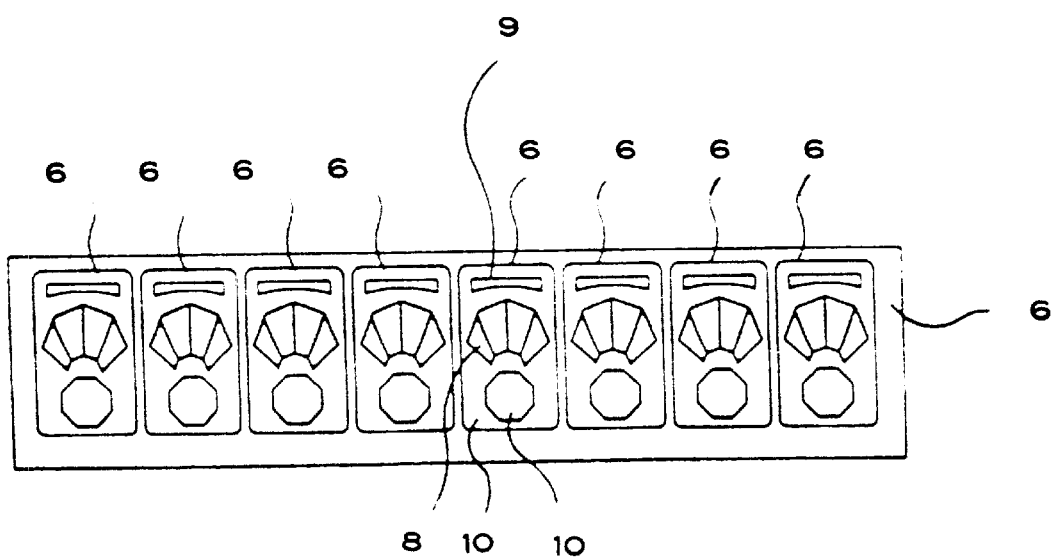
FIG. 3D3

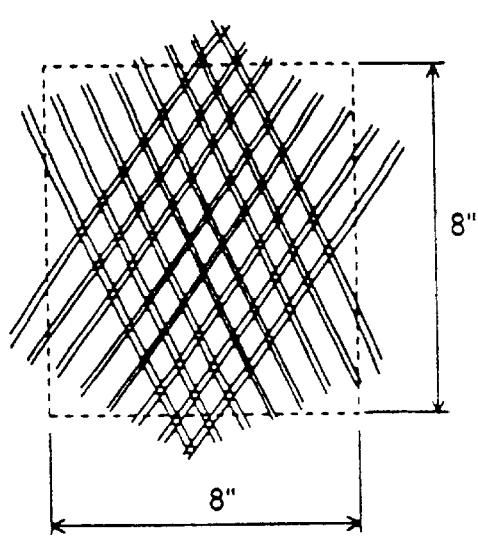
FIG. 3D4
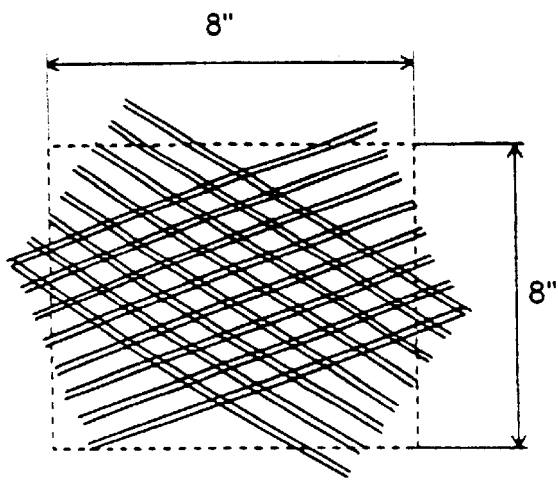
FIG. 3D5
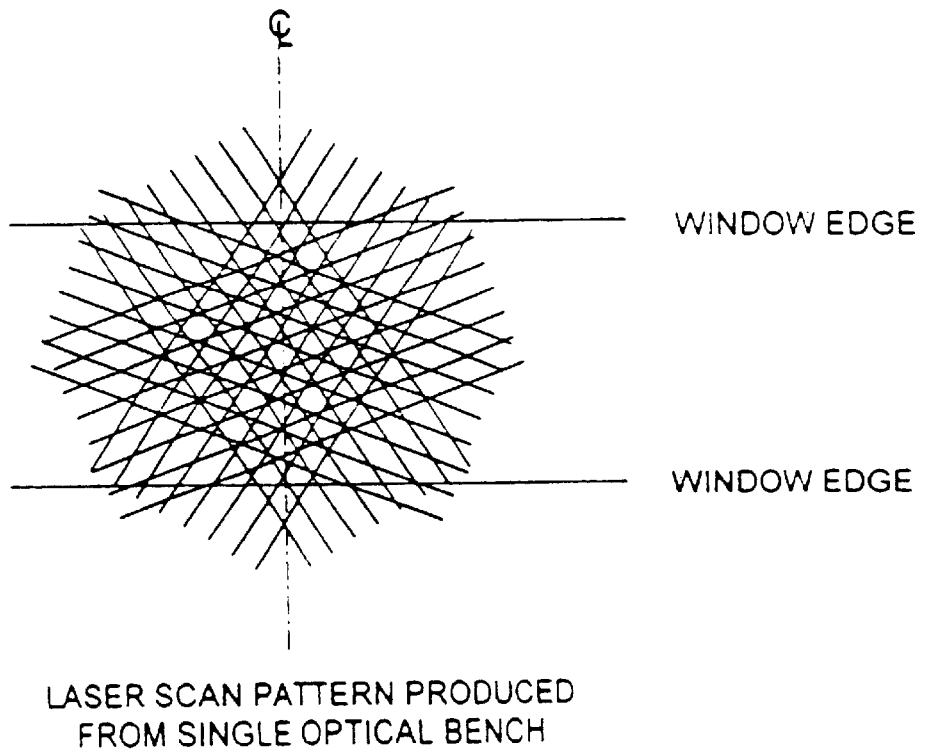
LASER SCAN PATTERN PRODUCED
FROM SINGLE OPTICAL BENCH
FIG. 3D6

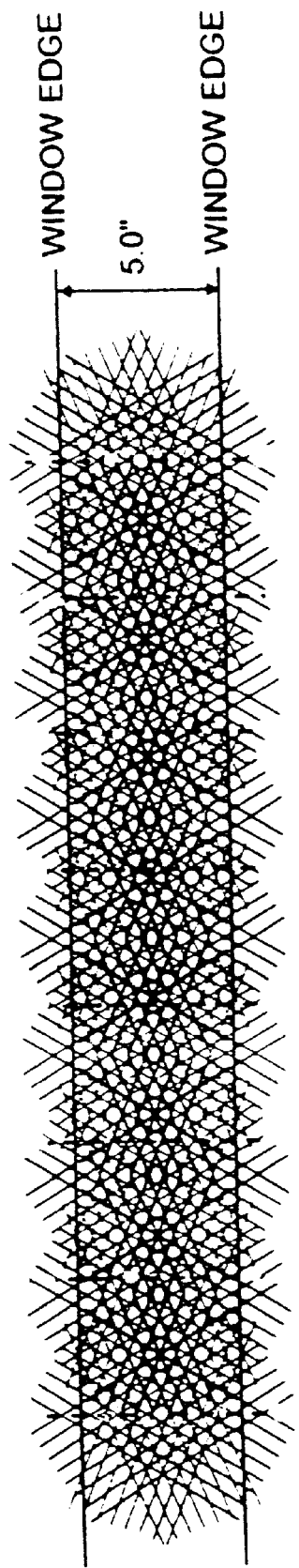
FIG. 3D7

AUTOMATED HOLOGRAPHIC-BASED TUNNEL-TYPE LASER SCANNING SYSTEM FOR OMNI-DIRECTIONAL SCANNING OF BAR CODE SYMBOLS ON PACKAGE SURFACES FACING ANY DIRECTION OR ORIENTATION WITHIN A THREE-DIMENSIONAL SCANNING VOLUME DISPOSED ABOVE A CONVEYOR BELT

CROSS-REFERENCE TO RELATED CASES

This is a Continuation-in-Part of application Ser. Nos.: 08/949,915 filed Oct. 14, 1997; 08/854,832 filed May 12, 1997 now 6,089,978; 08/886,806 filed Apr. 22, 1997 now 5,984,185; 08/726,522 filed Oct. 7, 1996 now 6,073,846; and 08/573,949 filed Dec. 18, 1995 now abandoned, each said application being commonly owned by Assignee, Metrologic Instruments, Inc., of Blackwood, New Jersey, and incorporated herein by reference as if fully set forth herein.

BACKGROUND OF THE INVENTION

1. Field of Invention

The present invention relates generally to tunnel type laser scanning systems arranged about a high-speed conveyor system used in diverse package routing and transport applications, and also a method of scanning bar code symbols on surfaces facing any direction with a 3-D scanning volume disposed above the conveyor system.

2. Brief Description of the Prior Art

In many environments, there is a great need to automatically identify objects (e.g. packages, parcels, products, luggage, etc.) as they are transported along a conveyor structure. While over-the-head laser scanning systems are effective in scanning upwardly-facing bar codes on conveyed objects, there are many applications where it is not practical or otherwise feasible to ensure that bar code labels are upwardly-facing during transported under the scanning station.

Various types of "tunnel" scanning systems have been proposed so that bar codes can be scanned independent of their orientation within scanning volume of the system. One such prior art tunnel scanning system is disclosed in U.S. Pat. No. 5,019,714 to Knowles. In this prior art scanning system, a plurality of single scanline scanners are orientated about a conveyor structure in order to provide limited degree of omni-directional scanning within the "tunnel-like" scanning environment. Notably, however, prior art tunnel scanning systems, including the system disclosed in U.S. Pat. No. 5,019,714, are incapable of scanning bar code systems in a true omni-directional sense, i.e. independent of the direction that the bar code faces as it is transported along the conveyor structure. At best, prior art scanning systems provide omni-directional scanning in the plane of the conveyor belt or in portions of planes orthogonal thereto. However, true omnidirectional scanning along the principal planes of a large 3-D scanning volume has not been hitherto possible.

Thus, there is a great need in the art for an improved tunnel-type laser scanning system and a method of scanning bar code symbols on packages being transported along a high-speed conveyor system, while avoiding the shortcomings and drawbacks of prior art scanning systems and methodologies.

OBJECTS AND SUMMARY OF THE PRESENT INVENTION

Accordingly, a primary object of the present invention is to provide a novel omni-directional tunnel-type laser scanning system that is free of the shortcomings and drawbacks of prior art tunnel-type laser scanning systems and methodologies.

Another object of the present invention is to provide such a tunnel-type laser scanning system, wherein bar code symbols that have been placed on any surface of any package, including USPS trays and tubs, and other customer mailed products, including the bottom surface of the product, are automatically scanned during movement through the system.

Another object of the present invention is to provide such a tunnel-type scanning system which can be used for high speed mail and parcel sorting systems (e.g. Large Package Sorting Systems (LPSS), Singulate and Scan Induction Units (SSIU), as well as luggage checking and tracking systems used in airport terminals, bus-stations, train stations, and the like.

Another object of the present invention is to provide such tunnel-type scanning system, which can read different bar code symbologies (e.g. Interleaved two of five, Code 128 and Code three of nine), code lengths, and formats in accordance with AIM and ANSI Standards.

Another object of the present invention is to provide such a tunnel-type scanning system, in which a user-interface is provided for programming the bar code symbologies, code lengths and code formats handled by each laser scanning unit within the system.

Another object of the present invention is to provide such a tunnel-type scanning system, for reading bar code symbols on packages having various types of symbol formats, such as ZIP Code symbols (six digits), Package Identification Code (PIC) symbols (sixteen characters), and Tray bar code symbols (ten digits).

Another object of the present invention is to provide such a tunnel-type scanning system, for omni-directional scanning of bar code symbols on packages, parcels and products transported along a high-speed conveyor system at velocities in the range of about 100 to 520 feet per minute or greater.

Another object of the present invention is to provide such a tunnel-type scanning system, in which a plurality of holographic laser scanning subsystems are mounted from a scanner support framework arranged about a high-speed conveyor belt, and arranged so that each scanning subsystem projects a highly-defined 3-D omni-directional scanning volume with a large depth-of-field, above the conveyor structure so as to collectively provide omni-directional scanning within each of the three principal scanning planes of the tunnel-type scanning system.

Another object of the present invention is to provide such a tunnel-type scanning system, in which each holographic laser scanning subsystem projects a highly-defined 3-D omni-directional scanning volume that has a large depth-of-field and is substantially free of spatially and temporally coincident scanning planes, to ensure substantially zero crosstalk among the numerous laser scanning channels provided within each holographic laser scanning subsystem employed in the system.

Another object of the present invention is to provide such a tunnel-type scanning system, in which a split-type conveyor is used with a gap disposed between its first and second conveyor platforms, for mounting of an omni-directional projection-type laser scanning subsystem that is below the conveyor platforms and extends substantially the entire width of the conveyor platform.

Another object of the present invention is to provide such a tunnel-type scanning system, wherein a plurality of holographic laser scanners are arranged about the conveyor system to produce a bi-directional scanning pattern along the principal axes of a three-dimensional laser scanning volume.

A further object of the present invention is to provide such a tunnel-type scanning system, in which each holographic laser scanner employed in the system projects a three-dimensional laser scanning volume having multiple focal planes and a highly confined geometry extending about a projection axis extending from the scanning window of the holographic scanner and above the conveyor belt of the system.

Another object of the present invention is to provide an improved tunnel-type scanning system, wherein bar code symbols downwardly facing the conveyor belt can be automatically scanned as they are transported through the system in a high-speed manner.

Another object of the present invention is to provide an improved method of scanning bar code symbols within a tunnel-scanning environment through which objects of various types can be conveyed at high transport speeds.

These and other objects of the present invention will become apparent hereinafter and in the Claims to Invention.

BRIEF DESCRIPTION OF THE DRAWINGS

For a more complete understanding of the present invention, the following Detailed Description of the Illustrative Embodiment should be read in conjunction in connection with the accompanying Drawings, wherein:

FIG. 2C is a table setting for data specifying the position and orientation of the sixteen omni-directional holographic laser scanners mounted within the tunnel scanning system of the illustrative embodiment of the invention, wherein the position of each single-disc holographic scanner is specified with respect to the center of the holographic scanning disc contained within each such scanning unit, and the position of each triple-disc holographic scanner is specified with respect to the center of the middle holographic scanning disc contained within each such scanning unit;

FIG. 3A1 is a perspective, partially cut-away view of the single-disc holographic laser scanning subsystem (e.g. indicated as L/F Corner #1, L/F Corner #2, L/B Corner #1, L/B Corner #2, R/F Corner #1, R/F Corner #2, R/B Corner #1 and R/B Corner #2 in FIG. 1 and the Scanner Positioning Table shown in FIG. 2C), mounted within the corners of the tunnel-type scanning system of the illustrative embodiment, showing the holographic scanning disc surrounded by one of its six beam folding mirrors, parabolic light collection mirrors, laser beam production modules, photodetectors, and analog and digital signal processing boards mounted on the optical bench of the subsystem;

FIG. 3A2 is a plan view of the single-disc holographic laser scanning subsystem employed in the tunnel scanning system of the illustrative embodiment, showing the holographic scanning disc surrounded by six laser scanning stations comprising a beam folding mirror, parabolic light collection mirror, laser beam production module (employing a VLD), each of which encloses a compact housing adapted for adjustable support by the scanner support framework employed in the tunnel scanning system of the illustrative embodiment;

FIG. 3A3 is an cross-sectional view of the single-disc holographic laser scanning subsystem shown in FIG. 3A2, showing its holographic scanning disc rotatably supported by its scanning motor mounted on the optical bench of the subsystem;

FIG. 3A4 is a schematic representation of the layout of the volume-transmission type holographic optical element (HOEs) mounted between the glass support plates of the holographic scanning disc employed within the single-disc holographic scanning subsystem employed within the tunnel scanning system of the illustrative embodiment;

FIG. 3A5 is a table setting forth the design parameters used to construct with the single-disc holographic scanning subsystem employed in the tunnel scanning system of the illustrative embodiment;

FIG. 3A6 is a schematic representation of the laser scanning pattern projected from the single-disc holographic laser scanning subsystem employed in the tunnel-type scanning system of the present invention;

FIG. 3B1 is a plan view of the triple-disc holographic scanning subsystem (e.g. indicated as Top/Front, Top/Back, Left Side/Front, Left Side/Back, Right Side/Front and Right Side/Back in FIG. 1 and the Scanner Positioning Table shown in FIG. 2C), mounted on the top and sides of the tunnel-type scanning system of the illustrative embodiment, showing three holographic scanning discs mounted on an optical bench with 13.3 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3B2 is a schematic representation of the layout of the volume-transmission type holographic optical elements (HOEs) mounted between the glass support plates of each holographic scanning disc employed within the triple-disc holographic scanning subsystem shown in FIG. 3B1;

FIG. 3B3 is a table setting forth the design parameters used to construct with the each holographic scanning subsystem employed in the triple-disc holographic laser scanner shown in FIG. 3B1;

FIG. 3B4 is a schematic representation of the laser scanning pattern projected the single-disc holographic laser scanning subsystem employed in the triple-disc holographic laser scanner shown in FIG. 3B4, when none beam folding mirrors associated therewith are angularly located or rotated;

FIG. 3B5 is a table setting forth the angular location and rotation of each beam folding mirror in the center and end-located holographic scanning subsystems employed in the triple-disc holographic laser scanner shown in FIG. 3B4;

FIG. 3B6 is a schematic representation of the laser scanning pattern projected from the center of the holographic laser scanning subsystem employed in the triple-disc holographic laser scanner shown in FIG. 3B4, wherein each of beam folding mirrors associated therewith are angularly located and rotated as shown in the table of FIG. 3B5, to achieve the desired scanning pattern;

FIG. 3B7 is a schematic representation of the laser scanning pattern projected from end-located holographic laser scanning subsystem employed in the triple-disc holographic laser scanner shown in FIG. 3B4, wherein each of beam folding mirrors associated therewith are angularly located and rotated to achieve the desired scanning pattern;

FIG. 3B8 is a schematic representation of the laser scanning pattern projected from the triple-disc holographic laser scanner shown in FIG. 3B4;

FIG. 3C1 is a plan view of the triple-disc holographic scanning subsystem (e.g. indicated as Front and Back in FIG. 1 and the Scanner Positioning Table shown in FIG. 2C), mounted on the top of the tunnel-type scanning system of the illustrative embodiment, showing three holographic scanning discs mounted on an optical bench with 14.0 inches spacing between the axis of rotation of each neighboring holographic scanning disc, and each holographic scanning disc being surrounded by six beam folding mirrors, six parabolic light collection mirrors, six laser beam production modules, six photodetectors, and six analog and digital signal processing boards mounted on the optical bench of the subsystem;

FIG. 3C2 is a schematic representation of the laser scanning pattern projected from the triple-disc holographic laser scanner shown in FIG. 3C1;

FIG. 3D1 is an exploded diagram of the fixed laser projection scanner mounted beneath the conveyor belt surface of the system, and between the first and second conveyor belt platforms of the conveyor subsystem employed in the tunnel scanning system of the illustrative embodiment of the present invention, showing the optical bench upon which eight fixed projection-type laser scanning subsystems are mounted and enclosed within a scanner housing having a rugged glass scanning window bridging the gap provided between the first and second conveyor belt platforms;

FIG. 3D2 is a perspective view of the projection-type laser scanning subsystem mounted within the bottom-mounted fixed projection scanner shown in FIG. 3D1, showing an eight-sided polygon scanning element rotatably mounted closely adjacent a stationary mirror array comprised of four planar mirrors, and a light collecting mirror being centrally mounted for focusing light onto a photodetector disposed slightly beyond the polygon scanning element;

FIG. 3D3 is a plan view of the eight fixed-projection laser scanning subsystems mounted on the optical bench of the bottom-mounted laser scanner shown in FIG. 3D1;

FIG. 3D4 is a schematic representation of the partial scanning pattern produced by the eight-sided polygon scanning element and two stationary mirrors mounted adjacent the central plane of each fixed-projection laser scanning subsystem mounted on the optical bench of the bottom-mounted laser scanner shown in FIG. 3D1;

FIG. 3D5 is a schematic representation of the partial scanning pattern produced by the eight-sided polygon scanning element and two outer stationary mirrors mounted adjacent the two inner-located stationary mirrors in each fixed-projection laser scanning subsystem mounted on the optical bench of the bottom-mounted laser scanner shown in FIG. 3D1;

FIG. 3D6 is a schematic representation of the complete scanning pattern produced by the eight-sided polygon scanning element and four stationary mirrors mounted about the central plane of each fixed-projection laser scanning subsystem mounted on the optical bench of the bottom-mounted laser scanner shown in FIG. 3D1;

FIG. 3D7 is a schematic representation of the resultant (collective) omni-directional scanning pattern produced through the conveyor mounted scanning window, by the eight fixed-projection laser scanning subsystems mounted on the optical bench of the bottom-mounted laser scanner shown in FIG. 3D1;

FIG. 4 is a schematic block diagram illustrating that the holographic and fixed-projection laser scanning subsystems, the package dimensioning subsystem, and the conveyor belt control subsystem employed within the tunneling scanner of the illustrative embodiment, are interfaced to a scan data management and system configuration computer system through a input/output port multiplier subsystem;

FIG. 6 is a schematic diagram showing the direction of omni-directional scanning provided in the X-Y plane of the 3-D scanning volume of tunnel scanning system hereof, by the Left Side Front, Left Side Back, Right Side Front and Right Side Back holographic laser scanning subsystems employed in the tunnel-type scanning system of the illustrative embodiment;

FIG. 7 is a schematic diagram showing the direction of omni-directional scanning provided in the Y-Z plane of the 3-D scanning volume of tunnel scanning system hereof, by the Front and Back holographic laser scanning subsystems employed in the tunnel-type scanning system of the illustrative embodiment;

DETAILED DESCRIPTION OF THE ILLUSTRATIVE EMBODIMENTS OF THE PRESENT INVENTION

Figure 1:
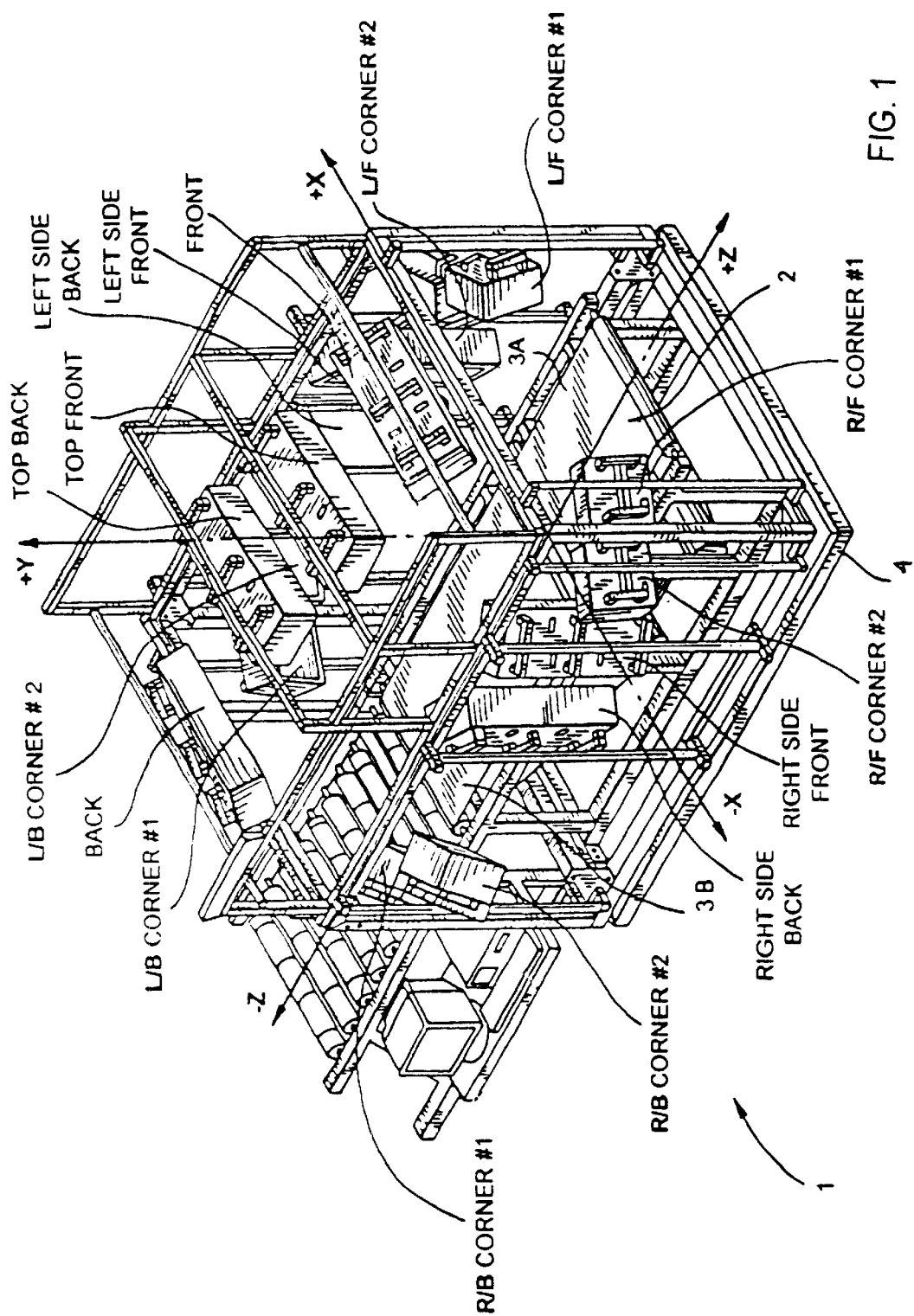
FIG. 1 is a first perspective view of the tunnel-type laser scanning system of the illustrative embodiment of the present invention.
Figure 1A:
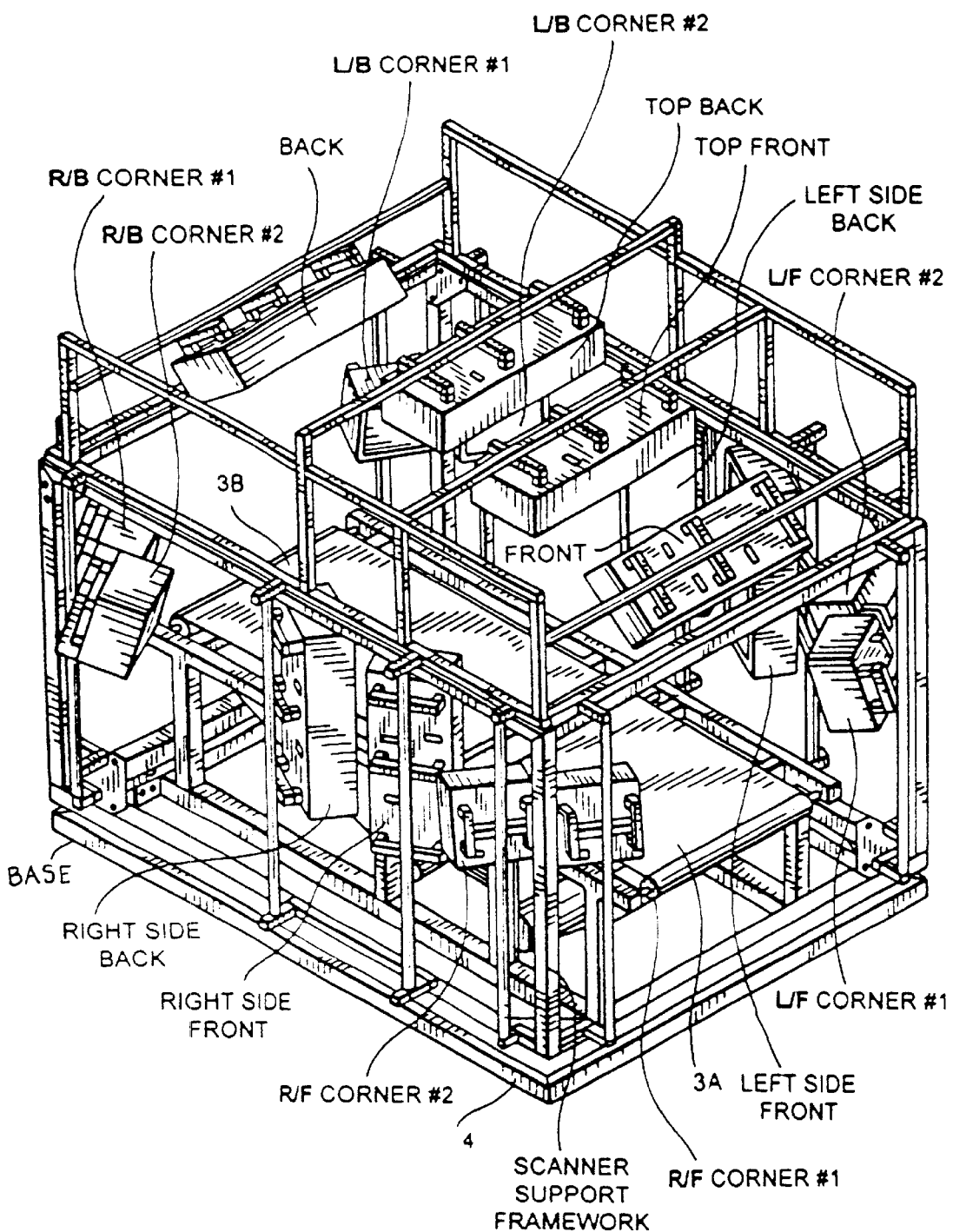
FIG. 1A is a second perspective view of the tunnel-type laser scanning system of the present invention, shown in larger scale and with a portion of its conveyor structure removed from the system.
Figure 1B:
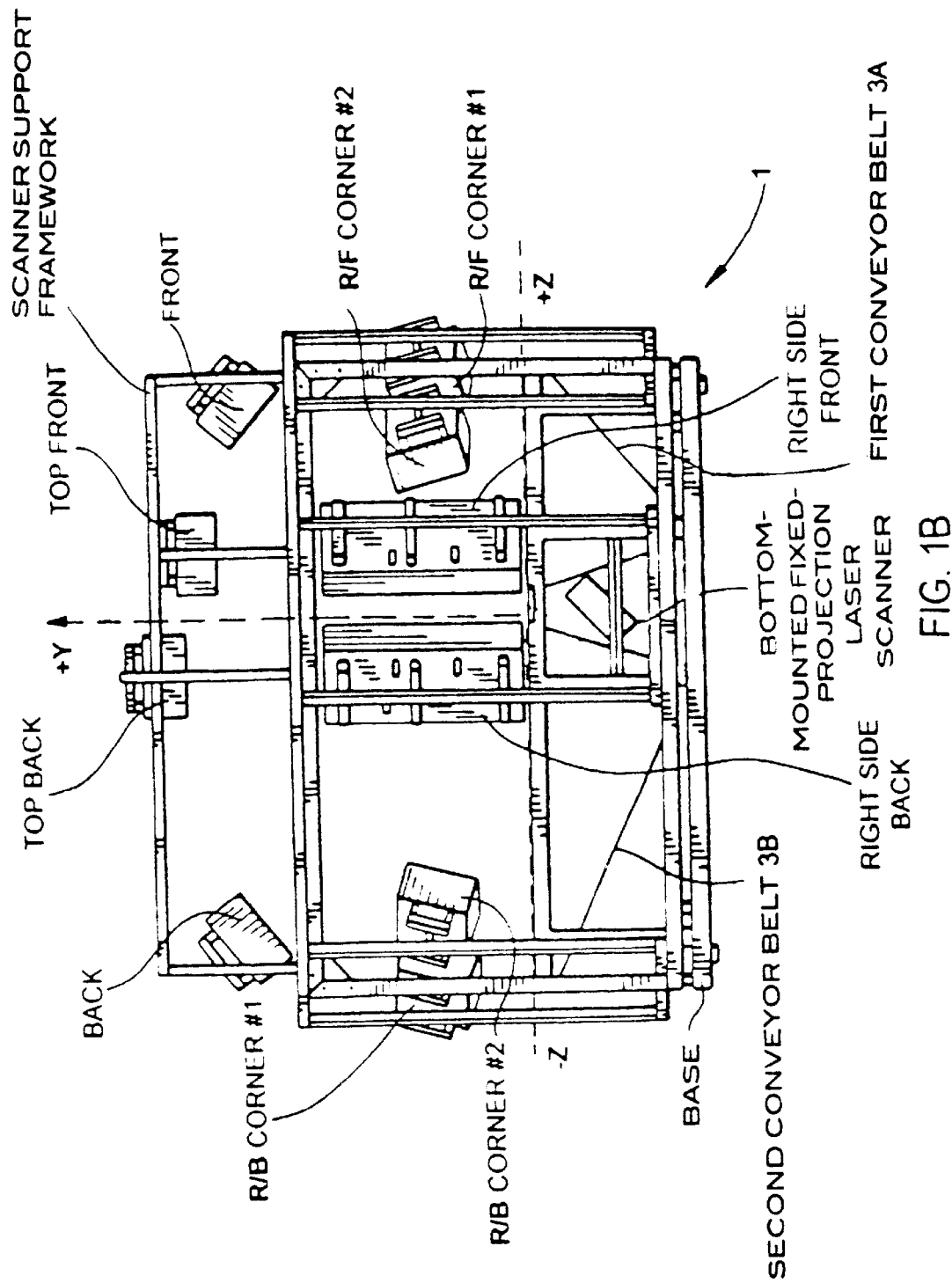
FIG. 1B is an elevated side view of the tunnel-type laser scanning system of the illustrative embodiment, removed from the scanner support framework, in order to clearly show the O-ring conveyor platform for staggering packages prior to entering the 3-D scanning volume, the light curtain associated with the packaging dimensioning subsystem for determining the total volume of the package, and whether there are multiple packages entering the 3-D scanning volume, a scan data management computer system (i.e. station) with a graphical user interface (GUI) for easily configuring the scanning subsystems within the system and monitoring the flow of packages into the scanning tunnel, and an exit sensor for detecting the exit of each scanned package within the scanning tunnel.

Referring to the figures in the accompanying Drawings, the various illustrative embodiments of the holographic laser scanner of the present invention will be described in great detail, wherein like elements will be indicated using like reference numerals.

In FIG. 1, there is shown a tunnel-type laser scanning system designed to meet the needs of demanding customers, such as the United States Postal Service (USPS), who requires "hands-free" bar code (or code symbol) scanning of at least six-packages, wherein the label containing the code symbol to be read can be placed in any orientation on any one of the six or more sides of the box or container structure. As used hereinafter, the term "hands-free" shall mean scanning of bar codes on boxes or parcels that are traveling past the scanners in only one direction on some sort of conveyor system.

Figure 1C:
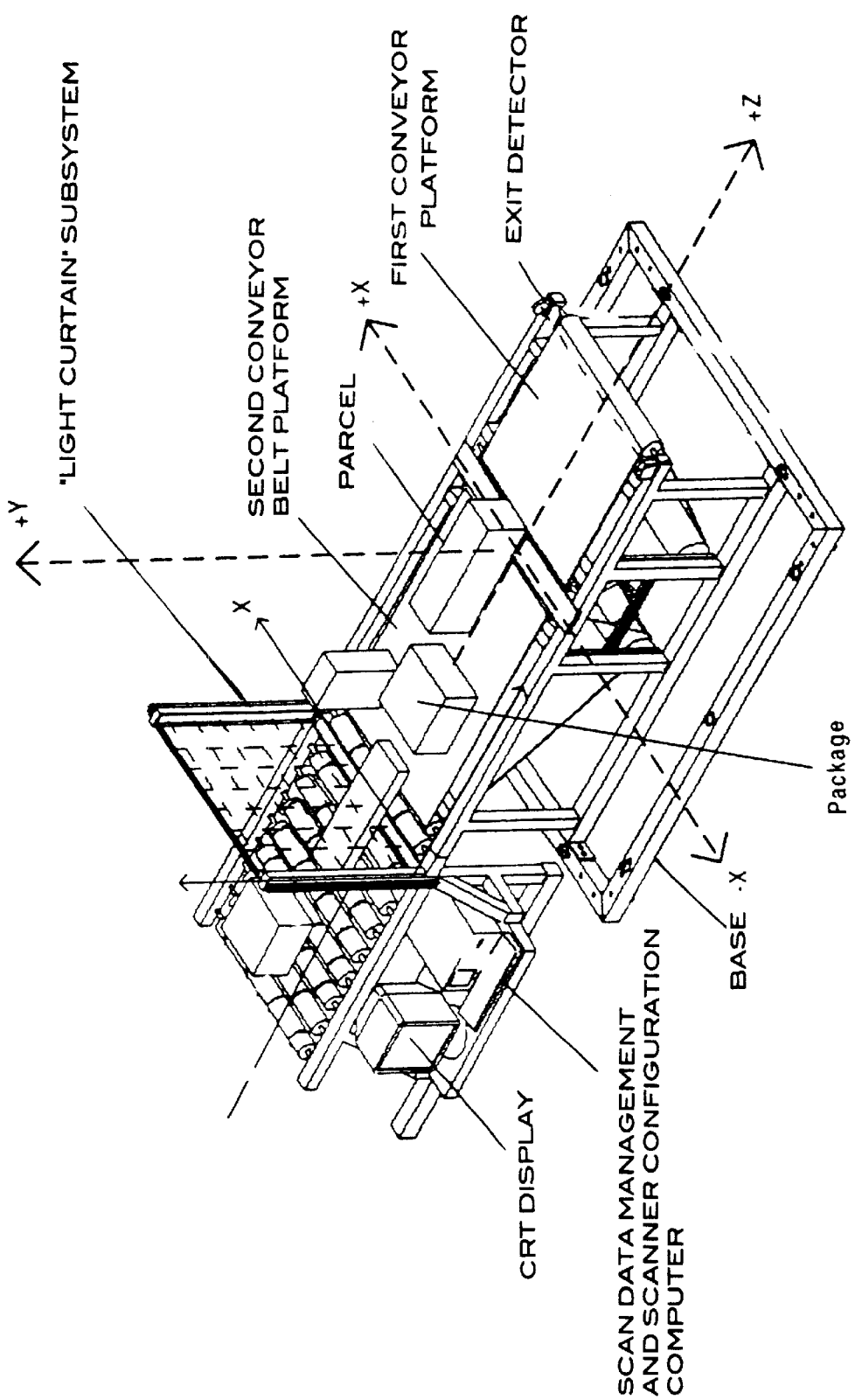
FIG. 1C is a perspective view of the tunnel-type laser scanning system of the illustrative embodiment of the present invention, shown in greater detail, detached from a portion of its roller-based conveyor subsystem and scan data management subsystem.
Figure 1D:
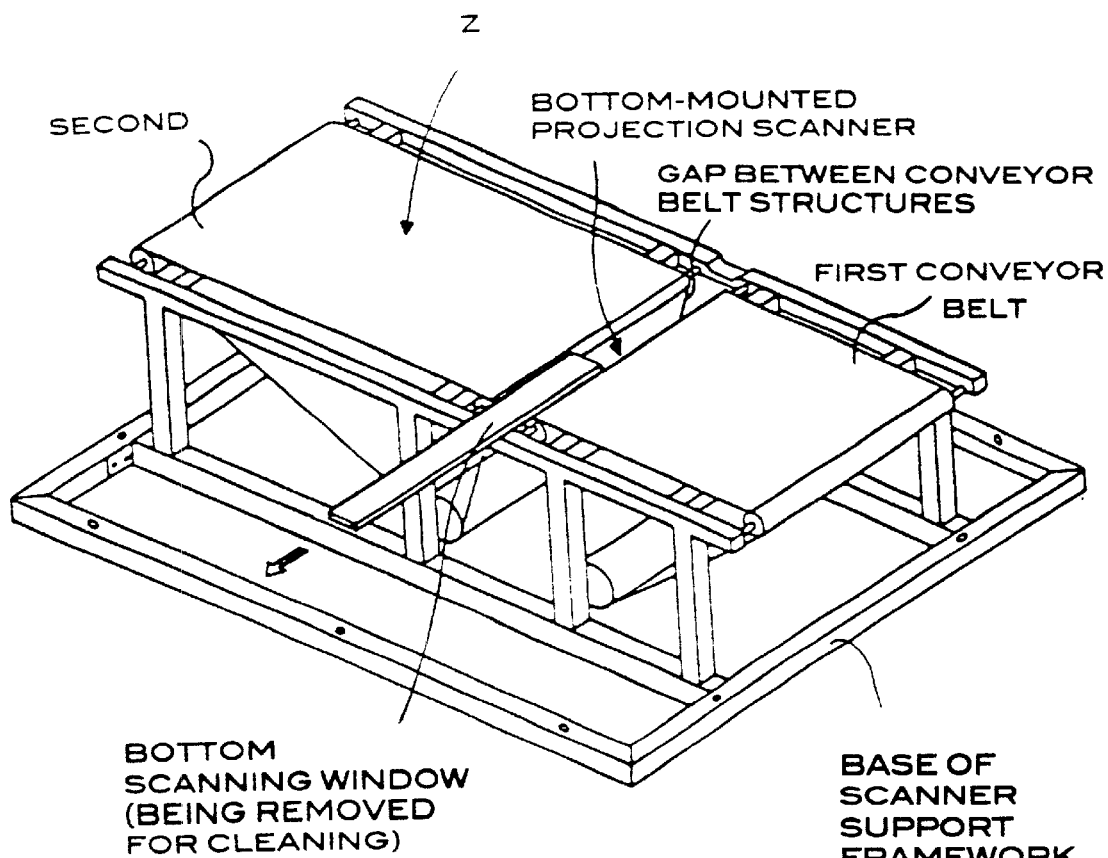
FIG. 1D is a perspective view of the split-section conveyor subsystem and its bottom-mounted laser scanning projection subsystem, and user-interface/workstation, shown detached from the scanner support framework shown in FIGS. 1, 1A and 1B.

As shown in FIGS. 1 through 1D, the tunnel scanning system of the illustrative embodiment 1 comprises an arrangement of laser scanning subsystems (i.e. scanners) which, by virtue of their placement, relative to a conveyor belt subsystem 2, essentially form a "tunnel" over the conveyor. In the field of package sortation of any sort, whether it be mail, luggage (as in an airport terminal) or other items or boxes, this type of code symbol scanning system is known as a "tunnel scanning system" by those skilled in the art.

The tunnel scanning system of the illustrative embodiment, and shown in great detail in the drawings has been designed and constructed to meet a specific set of customer-defined scanning. parameters. For example, the bar code label can be on any side of a box having six sides. The bar code label can be in any orientation. Furthermore the object bearing the bar code label to be read would move past the scanners on a conveyor belt travelling at speeds in excess of 400 feet per second. In the illustrative embodiment, the conveyor belt belts 3A and 3B move at 520 feet per second. The types of codes to be read include such codes as Code 39, Code 128 and others. The aspect ratio of the bar codes to be read is on the order of 10 mils and up.

The tunnel scanning system of the present invention can be used in various types of applications, such as for example, where the bar codes are read to determine (a) identification of incoming packages, (b) identification of outgoing packages, and (c) sortation of outgoing packages. For sortation types of applications, the information derived from the bar code will be used not only to identify the package, but also to direct the package along a particular path using deflectors, routers and other instruments well known in the package and parcel handling art.

In the illustrative embodiment, the volume to be scanned within the tunneling system (e.g. its 3-D scanning volume) is approximately: 1 meter wide (i.e. the width of the conveyor belt); ten feet long; and 1 meter tall (i.e. the height of the tallest possible box going through). The laser scanning pattern produced by, the concerted operation of the holographic laser scanning subsystems identified in the drawings, and described above, fills this entire 3-D scanning volume with over 400,000 scan lines per second. The 3-D scanning volume of the tunnel scanning system, measured with respect to the surface of the conveyor belt, begins at the surface of the conveyor belt in order to scan flat items (such as envelopes), and extends up approximately 1 meter ("h) above the surface of the conveyor belt subsystem.

Figure 2A:
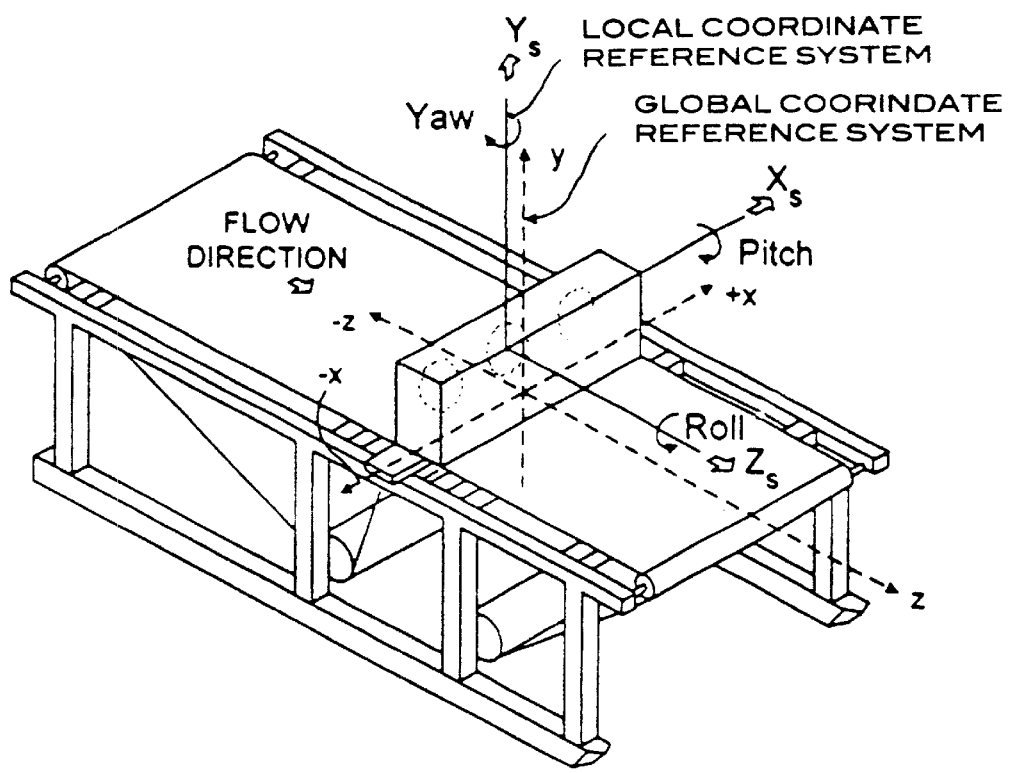
FIG. 2A is a perspective view of the split-conveyor subsystem removed from scanner support framework of the system, showing a coordinate reference framework symbolically embedded within the conveyor system and shown with graphical indications describing the directions of yaw, pitch and roll of each triple-scanning disc holographic scanner supported from the scanner support framework of the tunnel scanning system shown in FIGS. 1 and 1A.

As shown in FIGS. 1 through 1C, sixteen holographic laser scanning subsystems are mounted on a lightweight scanner support framework 4, at positions specified in Tunnel Scanner Positioning Data Table shown in FIG. 2C. The terms (e.g. "Top/Front", Top/Back", etc.) used in this Table to identify the individual holographic scanning subsystems of the tunnel scanning system hereof are used throughout the drawings, rather than reference numerals. The one fixed-projection scanner subsystem, identify by the label "Bottom", is mounted between the gap provided between the first and second conveyor platforms 3A and 3B comprising the conveyor subsystem of the tunnel scanning system.

Each of the holographic scanners (R/F Corner #1, R/F Corner #2, R/B Corner #1, R/B Corner #2, L/F Corner #1, L/F Corner #2, L/B Corner #1, LIB Corner #2) mounted within the corners of the scanner support framework are single-disc holographic scanning subsystems, having five focal planes, formed using six laser scanning stations, each having a VLD, a beam folding mirror, parabolic light collection mirror, signal processing circuit boards and the like, designed and constructed using the methods detailed in Applicant's application Ser. Nos. 08/949,915 filed Oct. 14, 1997; 08/854,832 filed May 12, 1997; 08/886,806 filed Apr. 22, 1997; 08/726,522 filed Oct. 7, 1996; and 08/573,949 filed Dec. 18, 1995, each incorporated herein by reference. The design parameters for the twenty facet holographic scanning disc shown in FIG. 3A4, and the supporting subsystem used therewith, are set forth in the Table of FIG. 3A5. Notably, these design parameters set forth in the table of FIG. 3A5 are defined in detail in the above-referenced U.S. Patent Applications. The scanning pattern projected on the middle (third) focal/scanning plane of each such single-disc holographic scanning subsystem is shown in FIG. 3A6.

Figure 8A:
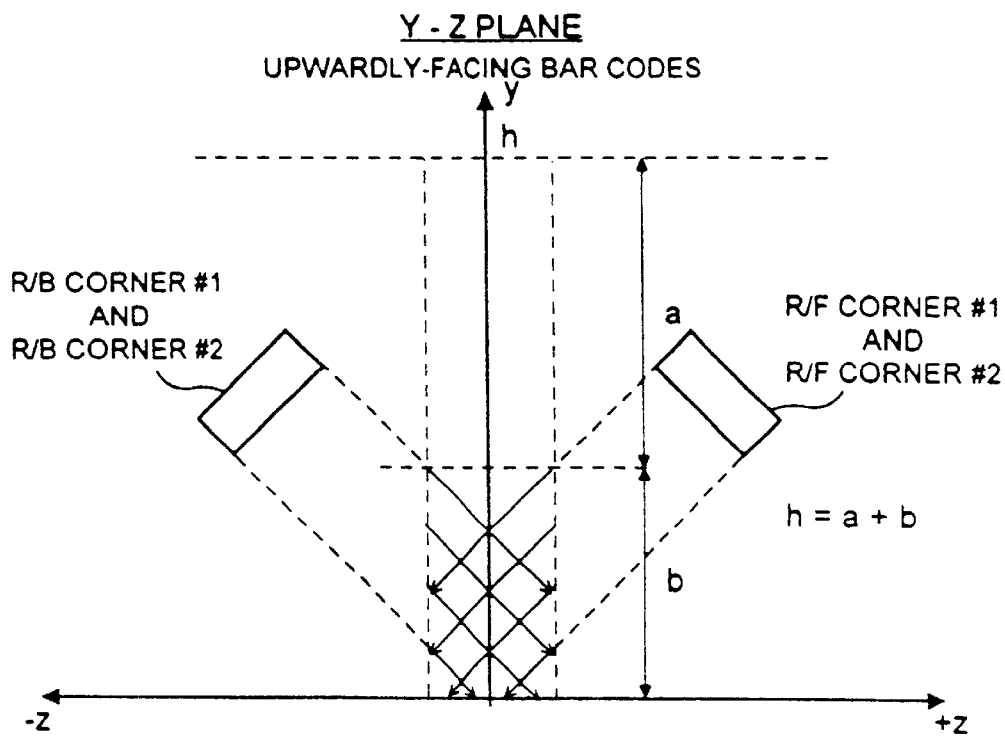
FIG. 8A is a schematic diagram showing the direction of omni-directional scanning provided in the Y-Z plane of the 3-D scanning volume of tunnel scanning system hereof, by the holographic laser scanning subsystems (indicated by R/B Corner #1, R/B Corner #2, L/F Corner #1 and R/B Corner #2) employed in the tunnel-type scanning system of the illustrative embodiment.
Figure 8B:
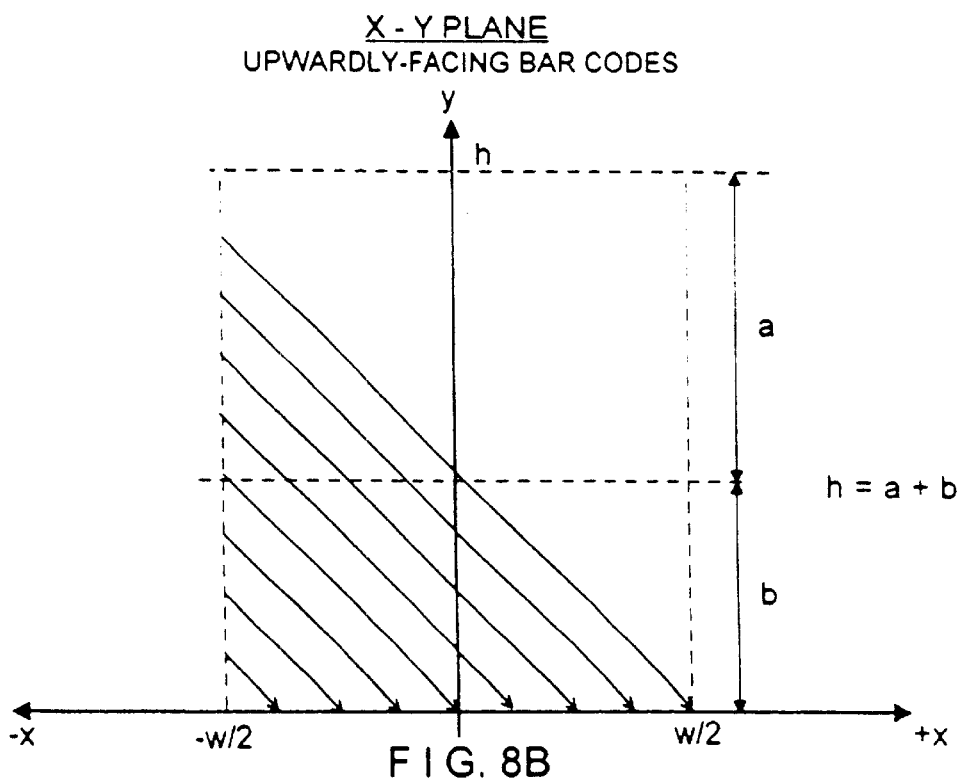
FIG. 8B is a schematic diagram showing the direction of omni-directional scanning provided in the X-Y plane of the 3-D scanning volume of tunnel scanning system hereof, by the holographic laser scanning subsystems (indicated by R/B Corner #1, R/B Corner #2, R/F Corner #1 and RIB Corner #2) employed in the tunnel-type scanning system of the illustrative embodiment.
Figure 9A:
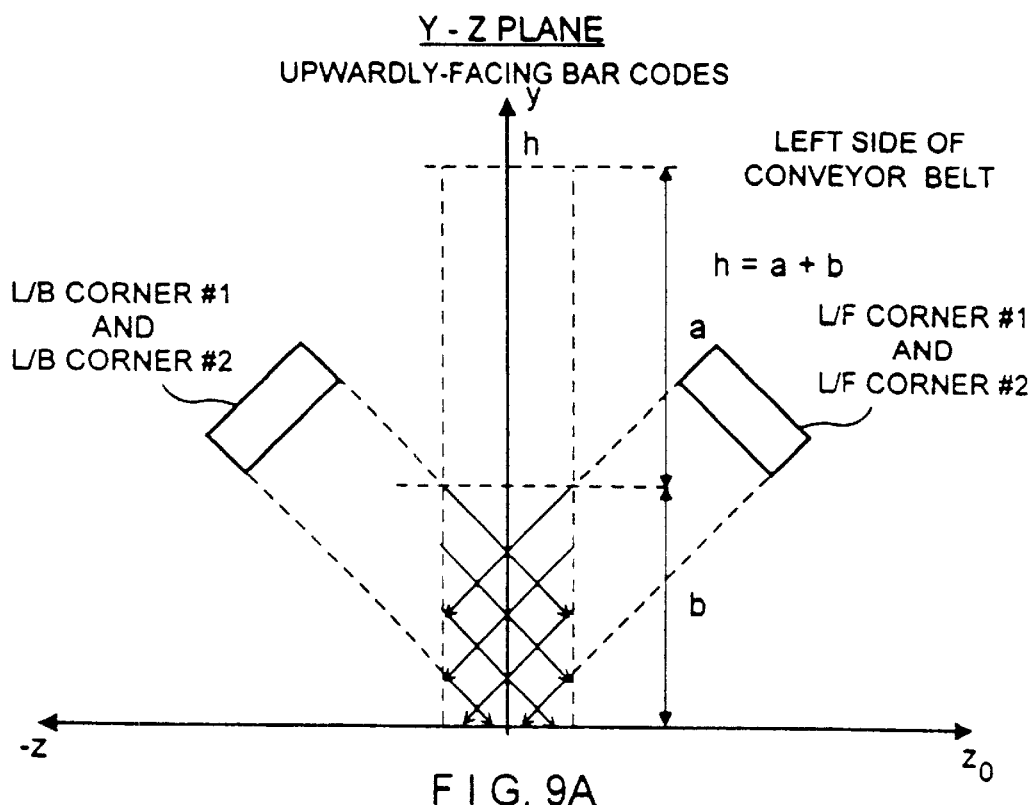
FIG. 9A is a schematic diagram showing the direction of omni-directional scanning provided in the Y-Z plane of the 3-D scanning volume of tunnel scanning system hereof, by the holographic laser scanning subsystems (indicated by L/B Corner #1, L/B Corner #2, L/F Corner #1 and L/B Corner #2) employed in the tunnel-type scanning system of the illustrative embodiment.
Figure 9B:
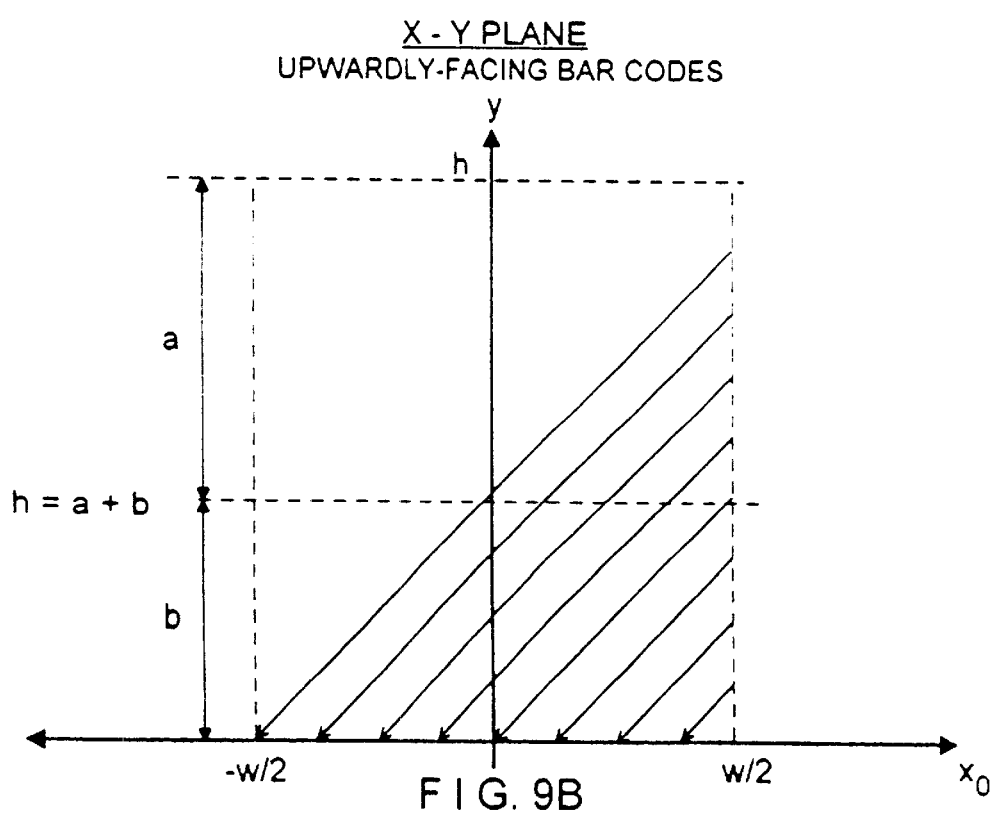
FIG. 9B is a schematic diagram showing the direction of omni-directional scanning provided in the X-Y plane of the 3-D scanning volume of tunnel scanning system hereof, by the holographic laser scanning subsystems (indicated by L/B Corner #1, L/B Corner #2, L/F Corner #1 and L/B Corner #2) employed in the tunnel-type scanning system of the illustrative embodiment.

As shown, the two triple-disc holographic scanners (Top Front and Top Back) are mounted above the conveyor belt by way of the scanner support framework. The four triple-disc holographic scanners (Left Side Front, Left Side Back, Right Side Front and Right Side Back) are mounted on the left and right sides of the scanner support framework. Each of these triple-disc holographic scanning subsystems is shown in greater detail in a FIGS. 3B1 through 3B8. Each of these holographic scanning subsystems has five focal planes, formed using three sets (groups) of six laser scanning stations, arranged about a twenty-facet scanning disc. Each laser scanning station about-the scanning disc has a VLD, a beam folding mirror, parabolic light collection mirror, signal processing circuit boards and the like. Each holographic laser scanning subsystem within these triple-disc scanners designed and constructed using the methods detailed in Applicant's application Ser. Nos. 08/949,915 filed Oct. 14, 1997; 08/854,832 filed May 12, 1997; 08/886,806 filed Apr. 22, 1997; 08/726,522 filed Oct. 7, 1996; and 08/573,949 filed Dec. 18, 1995, each incorporated herein by reference. The design parameters for each twenty facet holographic scanning disc shown in FIG. 3B2, and the supporting subsystem used therewith, are set forth in the Table of FIG. 3B3. Notably, the design parameters set forth in the table of FIG. 3B3 are defined in detail in the above-referenced US Patent Applications. The scanning pattern projected on the middle (third) focal/scanning plane of each such triple-disc holographic scanning subsystem is shown in FIG. 3B8.

Figure 2B:
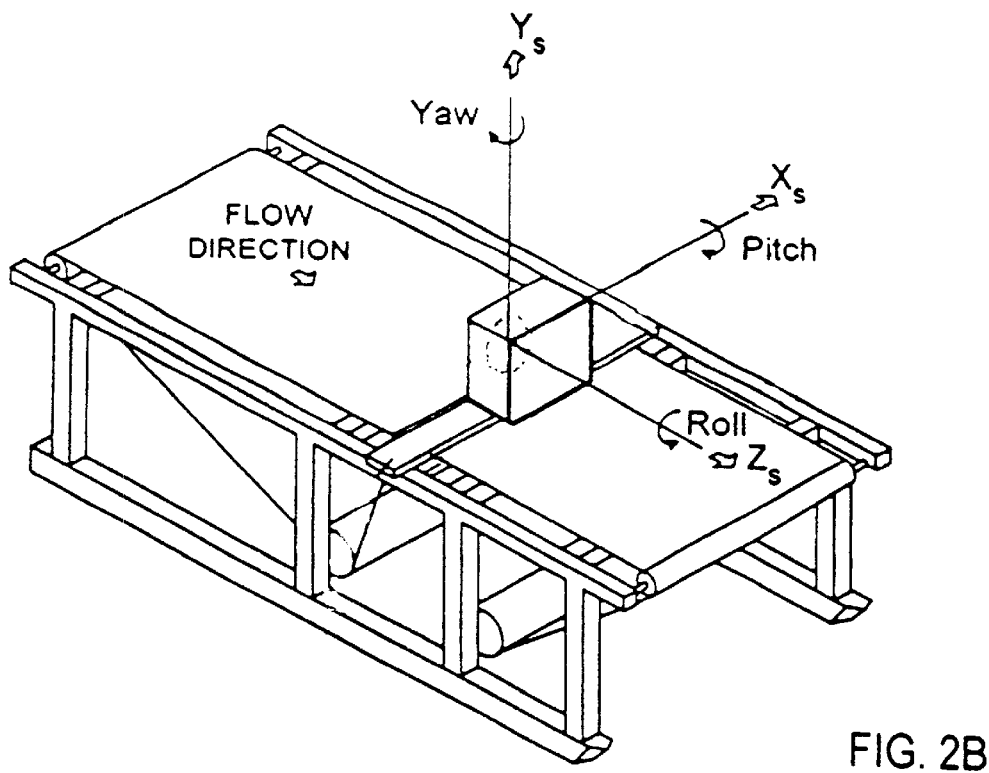
FIG. 2B is a perspective view of the split-conveyor subsystem removed from scanner support framework of the system, showing a coordinate reference framework symbolically embedded within the conveyor system and shown with graphical indications describing the directions of yaw, pitch and roll of each single-scanning disc holographic scanner supported from the scanner support framework of the tunnel scanning system shown in FIGS. 1 and 1A.

As shown, the two triple-disc holographic scanners (Front and Back) are mounted above the conveyor belt by way of the scanner support framework. Each of these triple-disc holographic scanning subsystems is shown in greater detail in FIGS. 3C1 and 3C2. Each of these holographic scanning subsystems has five focal planes, formed using three sets (groups) of six laser scanning stations, arranged about a twenty-facet scanning disc. Each laser scanning station about the scanning disc arranged has a VLD, a beam folding mirror, parabolic light collection mirror, signal processing circuit boards and the like. Each holographic laser scanning subsystem within these triple-disc scanners is designed and constructed using the methods detailed in Applicant's application Ser. Nos. 08/949,915 filed Oct. 14, 1997; 08/854,832 filed May 12, 1997; 08/886,806 filed Apr. 22, 1997; 08/726, 522 filed Oct. 7, 1996; and 08/573,949 filed Dec. 18, 1995, each incorporated herein by reference. The design parameters for each twenty facet holographic scanning disc shown in the table of FIG. 3A4, and the supporting subsystem used therewith, are set forth in the Table of FIG. 3A5. Notably, the design parameters set forth in the table of FIG. 3A5 are defined in detail in the above-referenced U.S. Patent Applications. The scanning pattern projected on the middle (third) focal/scanning plane of each such triple disc holographic scanning subsystem is shown in FIG. 3C2.

Figure 7:
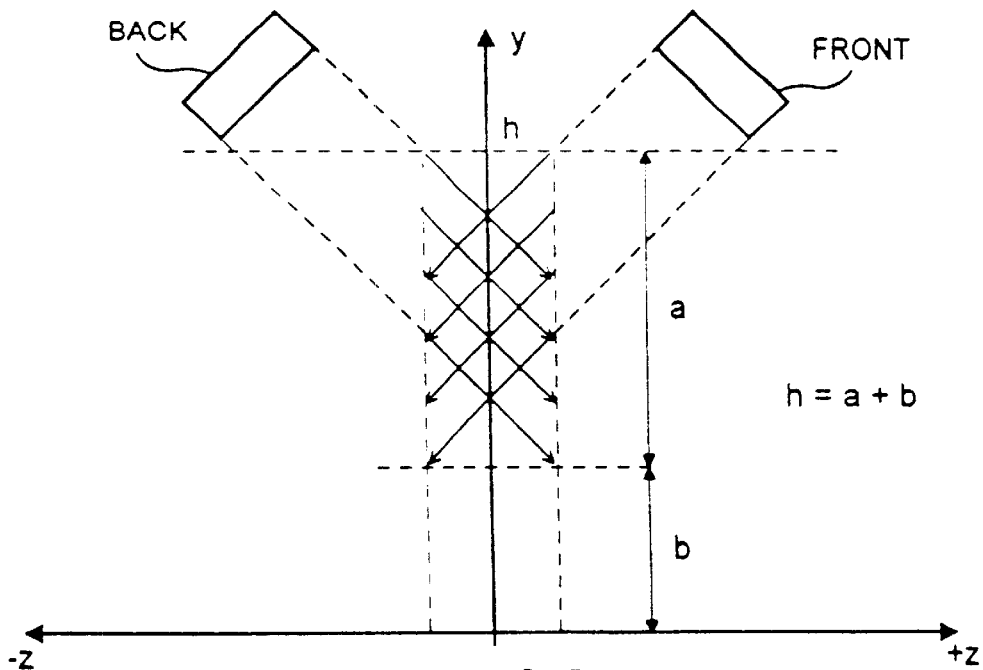

The bottom-mounted fixed projection scanner (Bottom) employed in the tunnel scanning system hereof is shown in greater detail in FIGS. 3D1 through 3D7. As shown in FIG. 3D1, the bottom-mounted scanner comprises eight fixed-projection laser scanning subsystems 6, shown in FIG. 3D2, that are mounted along optical bench 7 shown in FIG. 3D1. Each fixed projection scanning subsystem 6 comprises: four stationary mirrors 8 arranged about a central reference plane passing along the longitudinal extent of the optical bench 8 of the subsystem; and eight-sided motor driven polygon scanning element 10 mounted closely to the nested array of mirrors 8; a light collecting mirror 9 mounted above the nested array along the central reference plane; a laser diode 11 for producing a laser beam which is passed through collecting mirror 9 and strikes the polygon 10; and a photodetector 12, mounted above the polygon, for detecting reflected laser light in a manner well known in the art to produce scan data signals for signal processing.

Figure 4:
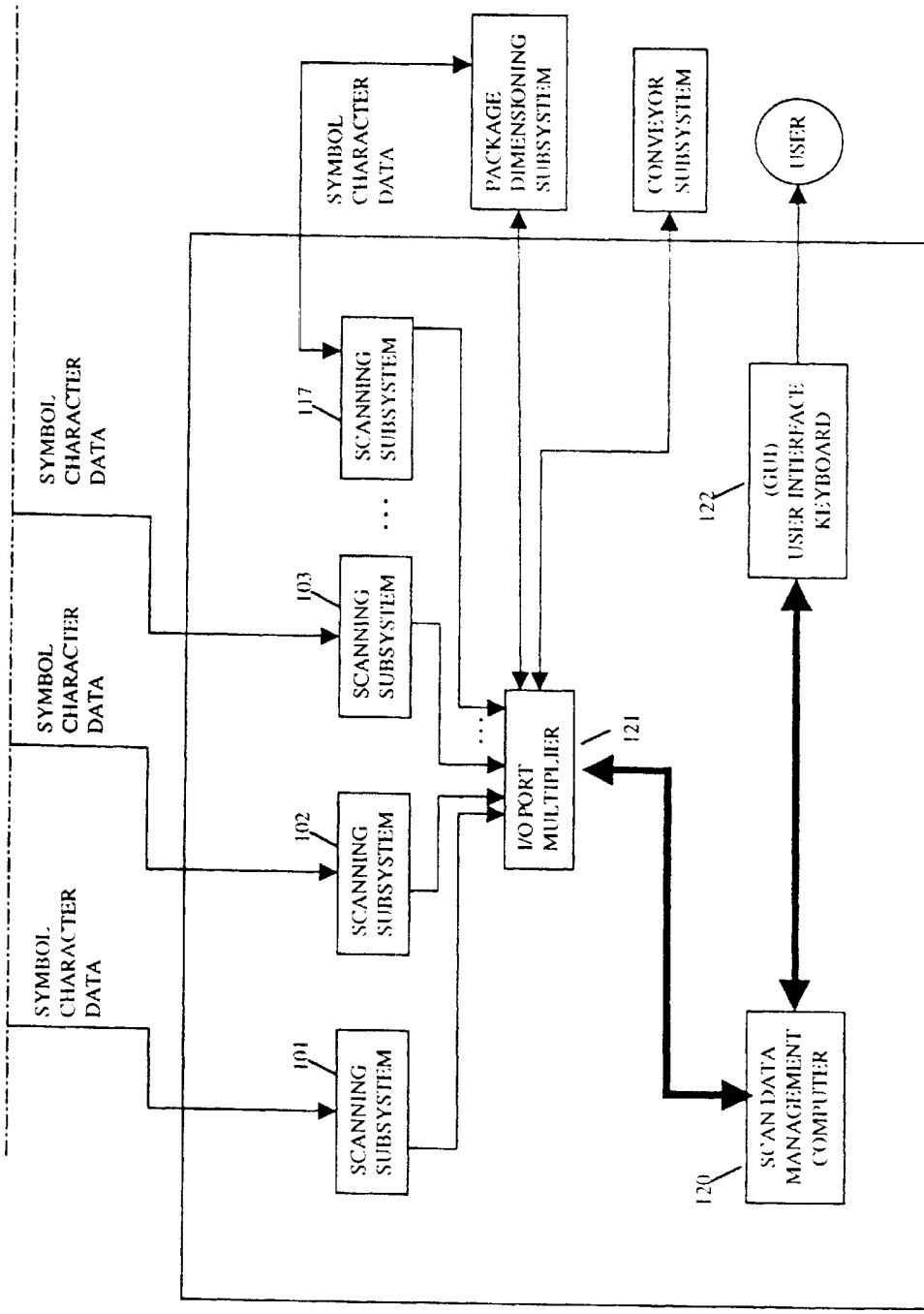
Figure 5A:
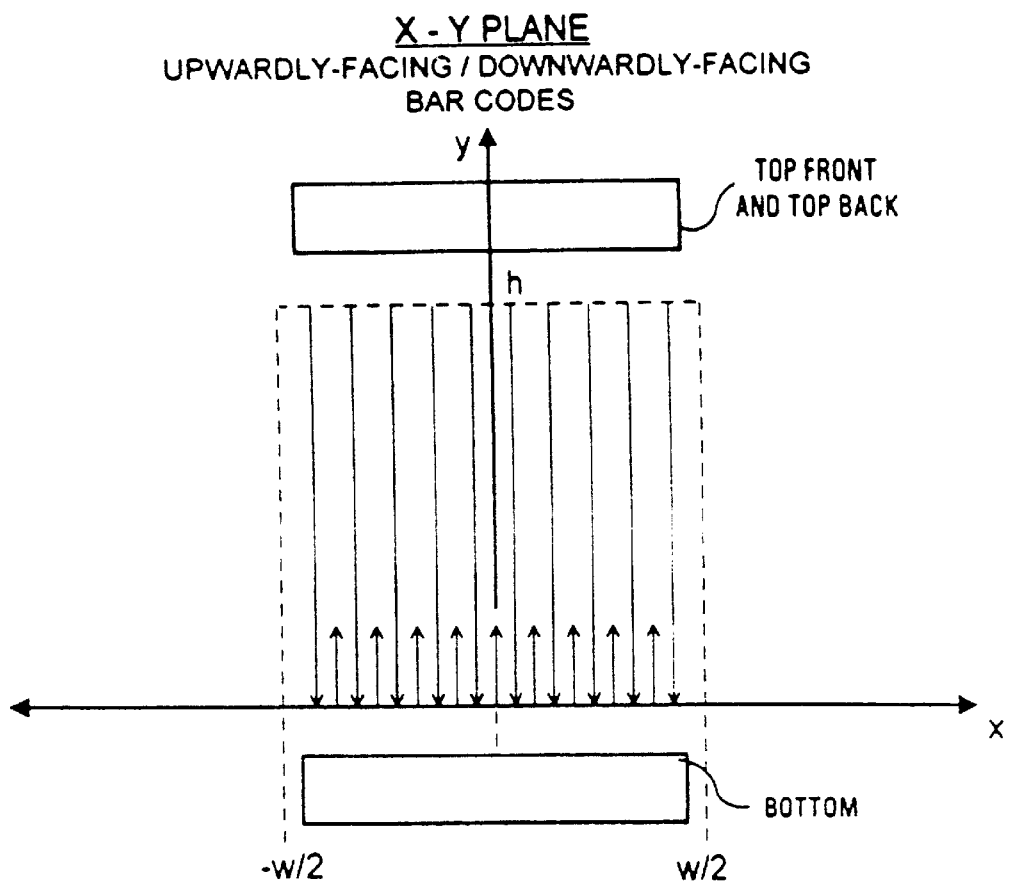
FIG. 5A is a schematic diagram showing the directions of omni-directional scanning provided in the X-Y plane of the 3-D scanning volume of tunnel scanning system hereof, by the Front and Back holographic laser scanning subsystems, and bottom-mounted fixed projection scanning subsystem employed in the tunnel-type scanning system of the present invention.
Figure 5B:
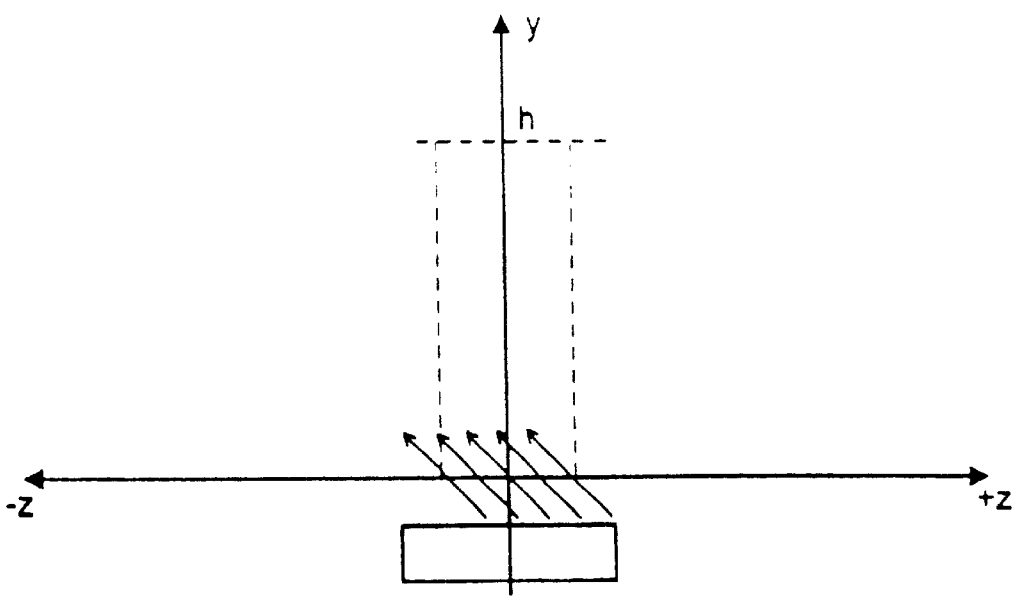
FIG. 5B is a schematic diagram showing the direction of omni-directional scanning provided in the Y-Z plane of the 3-D scanning volume of tunnel scanning system hereof, by the bottom-mounted fixed-projection laser scanning subsystem employed in the tunnel-type scanning system of the illustrative embodiment.
Figure 6:
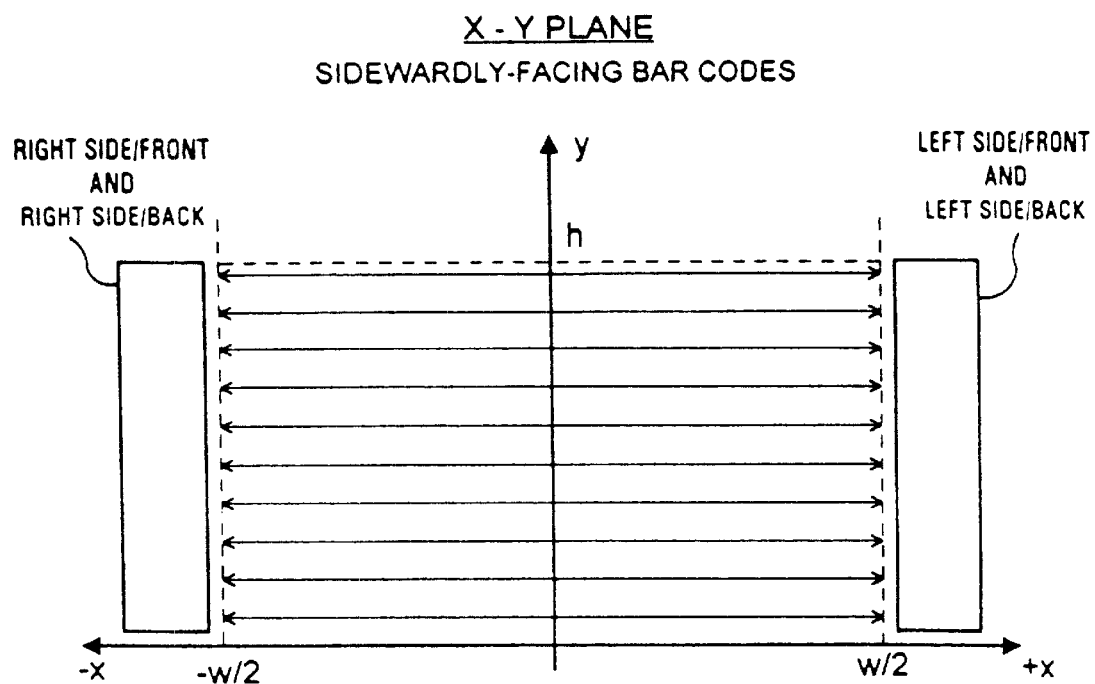

In FIGS. 3D4 and 3D5, the partial scan pattern produced by individual stationary mirrors in each subsystem 6 are shown. The complete pattern generated by each subsystem 6 is shown in FIG. 3D6. The composite omnidirectional scanning pattern generated by the eight subsystems 6 working together in the bottom scanner is shown in FIG. 3D7.

In FIG. 4, the seventeen individual scanning subsystems within the tunnel scanning system hereof (indicated by reference number 101 through 117) are interfaced with a scan data management and system configuration computer system 120 by way of an I/O port multiplier 121 well known in the art. The computer system has a GUI 122 supported by a display terminal, mouse, keyboard and the like. This GUI enables programming of the system and the like.

In FIGS. 5A through 9B, the various omnidirectional scanning directions provided for within the 3-D scanning volume of the tunnel scanner of the present invention are schematically illustrated. These illustrations indicate how each of the laser scanning subsystems within the tunnel scanning system contribute to produce the truly omnidirectional scanning performance attained by the tunnel scanner hereof.

The tunnel scanning system of the present invention can read different bar code symbologies (Interleaved two of five, Code 128 and Code three of nine) and formats so as to sort and identify packages at various package rates required by USPS or other end-user. The system of the illustrative embodiment can read the ZIP Code (six digits), Package Identification Code (PIC) (sixteen characters) and the Tray bar code (ten digits) symbols.

The tunnel scanning system hereof can be configured so that all of the products passing through the "tunnel" shall be scanned and read for the valid USPS bar coded symbols regardless of the position of the BCS on the surface of the product. This also includes the bottom surface of the product.

The tunnel scanning system hereof can be provided with equipment such as tachometers, dimensioning units, support structures, special power units (if required), air compressors and any other support equipment.

Preferably the tunnel scanning system of the present invention is constructed using standard interfaces such that scanners, decoders, concentrator, etc. are interchangeable.

The tunnel scanning system hereof can read bar coded symbols through the entire population of tray and tub label holders in use by the USPS. In addition, the tunnel scanning system can read BCS on the package products when the BCS label is placed under diaphanous materials.

There will be more than one symbol (BCS) on many of the packages found in the tunnel system hereof. Some of these symbols will not be valid USPS symbols. If there are multiple symbols on a package, the scanner logic will automatically identify and process only the USPS valid symbols.

The tunnel scanning system of the present invention can process all types of products found in BMC's (e.g. trays and tubs having extremely large variance in surface types and colors, e.g. plastics, Tyvek material, canvass, cardboard, polywrap, Styrofoam, rubber, dark packages). Some examples of these product types include: Softpack-Pillows, bags. Flats; Trays and tubs with and without bands. Cartons; Rugs, duffel bags (without strings or metal clips); mixed-tires, wooden containers Sacks; and Tires.

What is claimed is:

1. An automated holographic-based tunnel-type laser scanning system capable of scanning bar code symbols applied to the surfaces of packages facing along any direction or orientation within a three-dimensional scanning volume disposed above a conveyor belt structure, said automated holographic-based tunnel-type laser scanning system comprising:

a conveyor belt structure for transporting packages along a predetermined direction of travel, said conveyor belt structure having a width dimension and first and second conveyor platforms arranged closely together in a predetermined direction, with a gap region disposed between said first and second conveyor platforms and extending across said width dimension of said conveyor belt structure, and each said package having a plurality of surfaces and a bar code symbol applied to at least one said surface and each said package being arrangeable on said conveyor belt structure in any arbitrary orientation for transport along said predetermined direction of travel;

a scanner support framework arranged above a first position of said conveyor belt structure for supporting a plurality of holographic laser scanning subsystems above said conveyor belt structure so as to form a tunnel-type structure through which said conveyor belt structure extends and along which said packages are transported in an automated manner;

a bottom-located scanning subsystem disposed between said gap region in said conveyor belt structure, for producing an omni-directional scanning pattern along substantially the entire width dimension of said conveyor belt structure; and a plurality of holographic laser scanning subsystems mounted from said scanner support framework and arranged so that each said holographic laser scanning subsystem projects an omni-directional laser scanning pattern confined substantially within a three-dimensional laser scanning volume disposed above said conveyor belt structure and having a large depth-of-field; and wherein the omni-directional scanning pattern produced from said bottom-located scanning subsystem and the plurality of omni-directional laser scanning patterns produced from said plurality of holographic laser scanning subsystems cooperate and collectively produce a composite three-dimensional scanning pattern contained within an entire three-dimensional scanning volume disposed within said tunnel-type structure and above said conveyor belt structure, enabling the automated scanning of bar code symbols applied to the surfaces of said packages facing any direction or orientation within said entire three-dimensional scanning volume, and production of symbol character data representative of each said scanned bar code symbol.

2. The automated holographic-based tunnel-type laser scanning system of claim 1, wherein the omnidirectional laser scanning pattern produced by each said holographic laser scanning subsystem has multiple focal planes and a highly confined geometry extending about a projection axis extending from a scanning window provided within said holographic laser scanning subsystem and above said conveyor belt structure.

3. The automated holographic-based tunnel-type laser scanning system of claim 1 wherein said entire three-dimensional scanning volume has a widthwise dimension of at least about 1 meter extending along the width dimension of said conveyor belt structure, a lengthwise dimension of at least 1 meter extending along said predetermined direction of travel, and a heightwise dimension of at least 1 meter extending about said conveyor belt structure.

4. The automated holographic-based tunnel-type laser scanning system of claim 1, wherein said composite three-dimensional laser scanning pattern fills said entire three-dimensional scanning volume with at least 100,000 scan lines per second.

5. The automated holographic-based tunnel-type laser scanning system of claim 1, wherein said plurality of holographic laser scanning subsystems are mounted within the corners of said scanner support framework, on the top and sides of said scanner support framework, and on the front and back of said scanner support framework.

6. The automated holographic-based tunnel-type laser scanning system of claim 1, wherein said bottom-located scanning subsystem comprises a projection-type laser scanning subsystem.

7. The automated holographic-based tunnel-type laser scanning system of claim 1, which further comprises a package dimensioning subsystem, installed along a second portion of said conveyor belt structure, for measuring the dimensions of each package being transported through said tunnel-like structure.

8. The automated holographic-based tunnel-type laser scanning system of claim 1, which further comprises a computer system interfaced with said plurality of holographic laser scanning subsystems and said bottom-located scanning subsystem through an input/output port multiplier, said computer system supporting functions including scan data management and system configuration.

* * * * *